United States Patent
Kim et al.

(10) Patent No.: US 10,616,003 B2
(45) Date of Patent: Apr. 7, 2020

(54) METHODS AND SYSTEMS FOR SERVICE INTERWORKING BETWEEN SERVERS USING DIFFERENT USER IDENTIFICATION SYSTEMS

(71) Applicant: LINE BIZPLUS PTE., LTD., International Plaza (SG)

(72) Inventors: Boram Kim, Seongnam-si (KR); Kyewan Jun, Seongnam-si (KR); Won Hyuk Choi, Seongnam-si (KR); Bong Gun Song, Seongnam-si (KR); Soon-Yong Lee, Seongnam-si (KR)

(73) Assignee: Line Pay Corporation, Tokyo (JP)

( * ) Notice: Subject to any disclaimer, the term of this patent is extended or adjusted under 35 U.S.C. 154(b) by 88 days.

(21) Appl. No.: 15/584,194

(22) Filed: May 2, 2017

(65) Prior Publication Data
US 2017/0324586 A1 Nov. 9, 2017

(30) Foreign Application Priority Data

May 9, 2016 (KR) .................. 10-2016-0056313

(51) Int. Cl.
*H04L 12/66* (2006.01)
*G06F 21/00* (2013.01)
(Continued)

(52) U.S. Cl.
CPC .............. *H04L 12/66* (2013.01); *G06F 21/00* (2013.01); *G06F 21/30* (2013.01); *H04L 51/06* (2013.01); *H04L 63/0407* (2013.01); *H04L 63/12* (2013.01)

(58) Field of Classification Search
CPC ......... G06F 21/00; G06F 21/30; H04L 12/66; H04L 51/06; H04L 63/0407; H04L 63/12
See application file for complete search history.

(56) References Cited

U.S. PATENT DOCUMENTS 7,428,750 B1 * 9/2008 Dunn ..................... G06F 21/41
726/8
8,978,153 B1 * 3/2015 Cuthbertson ....... G06F 21/6254
726/26
(Continued)

FOREIGN PATENT DOCUMENTS

CN 1124427 A 6/1996
CN 101884230 A 11/2010
(Continued)

OTHER PUBLICATIONS

Chinese Office Action dated Nov. 25, 2019 in Chinese Application No. 201710321024.

*Primary Examiner* — Un C Cho
*Assistant Examiner* — Shah M Rahman
(74) *Attorney, Agent, or Firm* — Harness, Dickey & Pierce, P.L.C.

(57) ABSTRACT

According to at least some example embodiments, service interworking methods and systems are provided to identify registered users using different user identification systems performed by a first server having at least one processor and configured to identify registered users using a first user identification system, the method comprising: generating a first reference identifier of a first user in association with a first identifier identifying the first user in the first user identification system; managing the first reference identifier in association with the first identifier; receiving a second identifier identifying the first user in a second user identification system from the first user; and transmitting the first reference identifier and the second identifier to a second server configured to identify registered users using the second user identification system.

21 Claims, 19 Drawing Sheets

(51) Int. Cl.
*G06F 21/30* (2013.01)
*H04L 12/58* (2006.01)
*H04L 29/06* (2006.01)

(56) References Cited

U.S. PATENT DOCUMENTS

| | | | | |
|---|---|---|---|---|
| 2001/0039535 | A1* | 11/2001 | Tsiounis | G06Q 20/02 |
| | | | | 705/71 |
| 2007/0011104 | A1* | 1/2007 | Leger | G06Q 20/085 |
| | | | | 705/77 |
| 2007/0244811 | A1* | 10/2007 | Tumminaro | G06Q 20/10 |
| | | | | 705/39 |
| 2008/0177659 | A1* | 7/2008 | Lacey | G06Q 20/108 |
| | | | | 705/42 |
| 2009/0187490 | A1* | 7/2009 | Tali-Levi | G06Q 30/06 |
| | | | | 705/26.1 |
| 2009/0271847 | A1* | 10/2009 | Karjala | H04L 63/0807 |
| | | | | 726/6 |
| 2010/0030651 | A1* | 2/2010 | Matotek | G06Q 20/105 |
| | | | | 705/17 |
| 2010/0312713 | A1* | 12/2010 | Keltner | G06Q 10/10 |
| | | | | 705/317 |
| 2012/0185386 | A1* | 7/2012 | Salama | G06Q 20/108 |
| | | | | 705/42 |
| 2013/0060679 | A1* | 3/2013 | Oskolkov | G06Q 20/02 |
| | | | | 705/39 |
| 2013/0260893 | A1 | 10/2013 | Shin et al. | |
| 2013/0332543 | A1 | 12/2013 | Shin et al. | |
| 2013/0347078 | A1* | 12/2013 | Agarwal | H04L 63/00 |
| | | | | 726/4 |
| 2014/0019540 | A1 | 1/2014 | Shin et al. | |
| 2014/0101057 | A1* | 4/2014 | Oliver | G06Q 10/00 |
| | | | | 705/71 |
| 2015/0112864 | A1* | 4/2015 | Wallaja | G06Q 20/322 |
| | | | | 705/44 |
| 2016/0104133 | A1* | 4/2016 | Davis | G06Q 20/10 |
| | | | | 705/39 |
| 2016/0117665 | A1* | 4/2016 | Davis | G06Q 20/223 |
| | | | | 705/39 |
| 2017/0068953 | A1* | 3/2017 | Kim | G06Q 20/382 |

FOREIGN PATENT DOCUMENTS

| | | | | |
|---|---|---|---|---|
| JP | 2008-204412 | A | | 9/2008 |
| JP | 2008204412 | A * | 9/2008 | |
| KR | 20070027278 | A * | 3/2007 | |
| KR | 20080036365 | A * | 4/2008 | G06Q 20/102 |
| KR | 2010-0052992 | A | | 5/2010 |
| KR | 2011-0000052 | A | | 1/2011 |
| KR | 2012-0134319 | A | | 12/2012 |
| KR | 2013-0065751 | A | | 6/2013 |
| KR | 2013-0104572 | A | | 9/2013 |
| KR | 2016-0043556 | A | | 4/2016 |
| KR | 20160043556 | A * | 4/2016 | |
| WO | WO-2015/065001 | A1 | | 5/2015 |

\* cited by examiner

METHODS AND SYSTEMS FOR SERVICE INTERWORKING BETWEEN SERVERS USING DIFFERENT USER IDENTIFICATION SYSTEMS

CROSS-REFERENCE TO RELATED APPLICATION(S)

This application claims priority under 35 U.S.C. § 119 to Korean Patent Application No. 10-2016-0056313 filed on May 9, 2016, in the Korean Intellectual Property Office (KIPO), the entire contents of which are incorporated herein by reference.

BACKGROUND

Field

At least some example embodiments relate to service interworking methods and/or systems between servers that are configured to identify registered users using different user identification systems.

Description of Related Art

In general, services supplied from different providers identify users with different user identification systems. For example, a first service of a first company may identify users with character strings input from and registered by the users as identifiers, and a second service of a second company also may identify users with character strings input from and registered by the users as identifiers. Here, the same user may input a first identifier at the first service and may input a second identifier different from the first identifier at the second service. In this case, if the first service interworks with the second service, the user may not be identified at the second service using the first identifier. Likewise, the user may not be identified at the first service using the second identifier. As another example, the first service may identify users using identifiers input from and registered by the users, and the second service may identify users using telephone numbers of the users. Between services configured to identify users using different user identifications systems users may not be identified using the existing identifiers.

Also, if a first company of a first country is to perform service interworking with a second company of a second country without establishing a corporation and/or acquiring a license in the second country, the first company may not be provided with personal information of users from the second company due to legal issues involving the utilization of personal information, and the like.

SUMMARY

At least some example embodiments provide service interworking methods and systems that enable servers using different user identification systems to generate and share separate reference identifiers for users and to identify the users associated with service interworking without communication about or sharing personal information of the users between the servers.

According to at least some example embodiments, there are provided service interworking methods to identify registered users using different user identification systems performed by a first server having at least one processor and configured to identify registered users using a first user identification system, the methods include generating, using the at least one processor, a first reference identifier of a first user in association with a first identifier identifying the first user in the first user identification system. The methods further include managing, using the at least one processor, the first reference identifier in association with the first identifier. The methods further include receiving, using the at least one processor, a second identifier identifying the first user in a second user identification system from the first user. Furthermore, the methods include transmitting, using the at least one processor, the first reference identifier and the second identifier to a second server configured to identify registered users using the second user identification system.

According to at least some example embodiments, there are provided service interworking methods to identify registered users using different user identification systems performed by a first server having at least one processor and configured to identify registered users using a first user identification system. The methods include receiving, using the at least one processor, a first identifier identifying a first user in the first user identification system and a first reference identifier of the first user generated at a second server configured to identify registered users using a second user identification system. The methods further include identifying, using the at least one processor, the first user based on the first identifier in response to the receiving. The methods further include managing, using the at least one processor, the first reference identifier in association with the first user in response to the receiving and the identifying. Furthermore, the methods include the first user is identified at the second server based on a second identifier of the second user identification system.

According to at least some example embodiments, there are provided service interworking systems of a first server configured to identify registered users using a first user identification system. The systems include a memory having computer-readable instructions stored thereon and one or more processors communicatively coupled to the memory and configured to execute the computer-readable instructions. The one or more processors are configured to generate a first reference identifier of a first user in association with a first identifier identifying the first user in the first user identification system. The one or more processors are further configured to manage the first reference identifier in association with the first identifier. The one or more processors are further configured to receive a second identifier identifying the first user in a second user identification system, from the first user. Furthermore, the one or more processors are further configured to transmit the first reference identifier and the second identifier of the first user to a second server configured to identify registered users using the second user identification system.

According to at least some example embodiments, servers using different user identification systems may generate and share separate reference identifiers for users and may identify the users associated with service interworking without communication about or sharing personal information of the users.

Further areas of applicability will become apparent from the description provided herein. The description and specific examples in this summary are intended for purposes of illustration only and are not intended to limit the scope of the present disclosure.

BRIEF DESCRIPTION OF THE FIGURES

At least some example embodiments will be described in more detail with regard to the figures, wherein like reference numerals refer to like parts throughout the various figures unless otherwise specified, and wherein.

Figure 1:
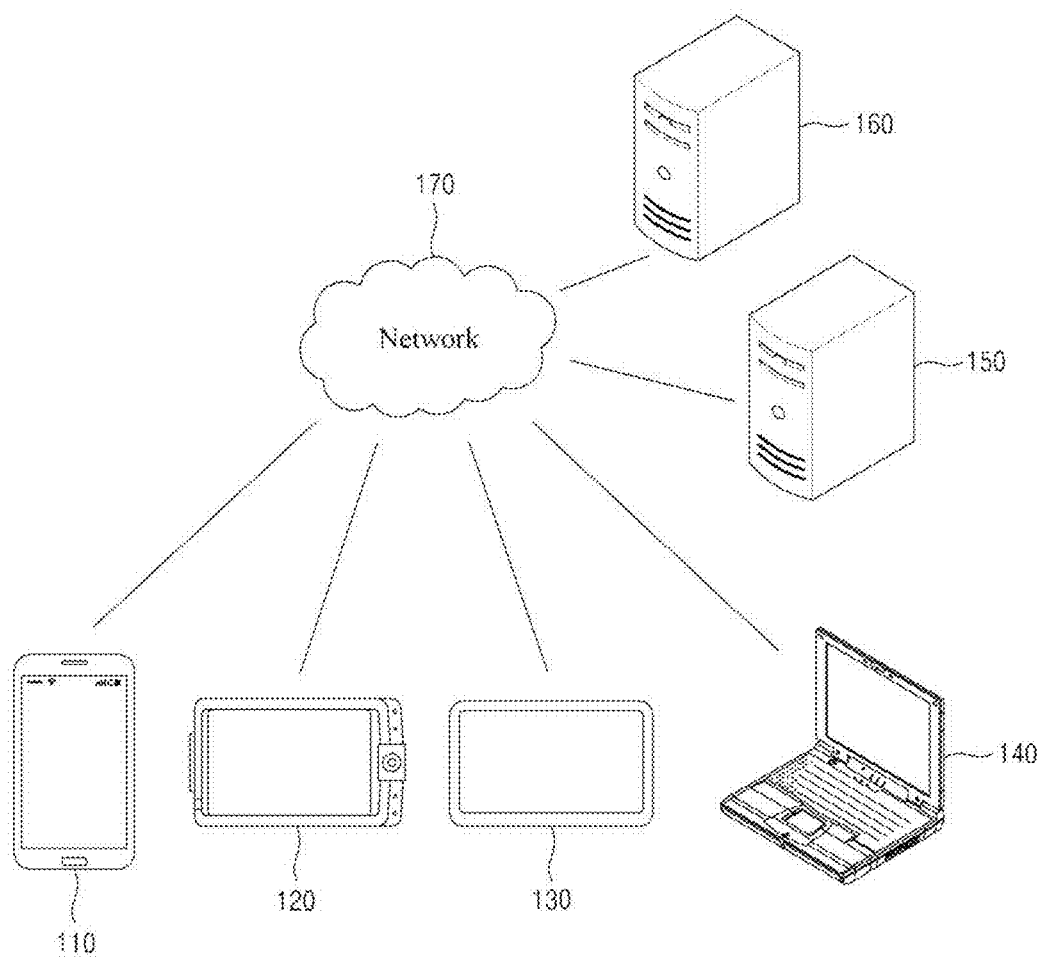
FIG. 1 is a diagram illustrating a network environment according to at least some example embodiments.

It should be noted that these figures are intended to illustrate the general characteristics of methods and/or structure utilized in at least some example embodiments and to supplement the written description provided below. These drawings are not, however, to scale and may not precisely reflect the precise structural or performance characteristics of any given example embodiment, and should not be interpreted as defining or limiting the range of values or properties encompassed by at least some example embodiments.

DETAILED DESCRIPTION

At least some example embodiments will be described in detail with reference to the accompanying drawings. At least some example embodiments, however, may be embodied in various different forms, and should not be construed as being limited only to example embodiments. Rather, example embodiments are provided as examples so that this disclosure will be thorough and complete, and will fully convey the concepts of this disclosure to those skilled in the art. Accordingly, known processes, elements, and techniques, may not be described with respect to at least some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "includes", "including", "included", "include", "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

At least some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed contemporaneously, or in some cases be performed in reverse order.

Units, constituent elements and/or devices according to at least some example embodiments may be implemented using hardware and/or a combination of hardware and software. In at least some example embodiments, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. At least some example embodiments of program code may include both machine code produced by a compiler and higher level program code that is executed using an interpreter.

In at least some example embodiments, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In at least some example embodiments, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, in at least some example embodiments, software and data may be stored by one or more computer readable recording mediums, including the tangible or non-transitory computer-readable storage media discussed herein.

According to at least some example embodiments, computer processing devices may be described as including various functional units that perform various operations and/or functions to increase the clarity of the description. However, computer processing devices are not intended to be limited to these functional units. In at least some example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units, constituent elements and/or devices according to at least some example embodiments may also include one or more storage devices. The one or more storage devices may be tangible or non-transitory computer-readable storage media, such as random access memory (RAM), read only memory (ROM), a permanent (e.g., non-volatile) mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing at least some example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for use in at least some example embodiments, or they may be known devices that are altered and/or modified for use in at least some example embodiments.

A hardware device, such as a computer processing device, may run an operating system (OS) and one or more software applications that run on the OS. The computer processing device also may access, store, manipulate, process, and create data in response to execution of the software. For simplicity, at least some example embodiments may be described as being embodied by one computer processing device; however, one skilled in the art will appreciate that a hardware device may include multiple processing elements and multiple types of processing elements. In at least some example embodiments, a hardware device may include multiple processors (e.g., a multiprocessor system) or a processor and a controller. In addition, other processing configurations are possible, such as parallel processors.

Although described with reference to specific examples and drawings, modifications, additions and substitutions of at least some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least some example embodiments will be described with reference to the accompanying drawings.

FIG. 1 is a diagram illustrating a network environment according to at least some example embodiments. Referring to FIG. 1, the network environment includes a plurality of electronic devices 110, 120, 130, and 140, a plurality of servers 150 and 160, and a network 170. FIG. 1 is provided as an example only and thus, at least some example embodiments are not limited thereto and the number of electronic devices and/or the number of servers is not limited thereto and the network environment may contain more or less constituent elements.

Each of the plurality of electronic devices 110, 120, 130, and 140 may be a fixed terminal or a mobile terminal configured as a computer device. In at least some example embodiments, the plurality of electronic devices 110, 120, 130, and 140 may be a smartphone, a mobile phone, a navigation device, a personal computer, a laptop computer, a digital broadcasting terminal, a personal digital assistant (PDA), a portable multimedia player (PMP), a tablet, a game console, a wearable device, an augmented reality and/or virtual reality device, and Internet of things device, and the like. In at least some example embodiments, the electronic device 110 may communicate with other electronic devices 120, 130, and/or 140, and/or the servers 150 and/or 160 over the network 170 in a wired communication manner or in a wireless communication manner.

The communication scheme is not particularly limited and may include communication methods that use near field communication between devices as well as communication methods using a communication network, such as, a mobile communication network, the wired Internet, the wireless Internet, a broadcasting network, etc. In at least some example embodiments, the network 170 may include at least one of network topologies that include networks, such as, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only at least some example embodiments and example embodiments are not limited thereto.

Each of the servers 150 and 160 may be configured as a computer apparatus or a plurality of computer apparatuses that provides instructions, codes, file, contents, services, and the like through communication with the plurality of electronic devices 110, 120, 130, and/or 140 over the network 170.

In at least some example embodiments, the server 150 may provide a first service to the plurality of electronic devices 110, 120, 130, and/or 140 connected over the network 170. The server 160 also may provide a second service to the plurality of electronic devices 110, 120, 130, and/or 140 connected over the network 170. In at least some example embodiments, the first service may be a messenger service that routes a transmission/reception of an instant message, and the second service may be a payment service that processes a deposit, a withdrawal, a payment, a remittance, a reference, a change, etc., of a user. In at least some example embodiments, the first service may be a service that provides a payment service together with a messenger service, and the second service may be a service that provides only a payment service. The first service and the second service may be included in any type of services that may be provided to the plurality of electronic devices 110, 120, 130, and/or 140 over the network 170, such as a search service, a social network service (SNS), a content providing service, and the like. Herein, the first service and the second service are assumed as services that identify a user(s) using different user identification systems, respectively.

Figure 2:
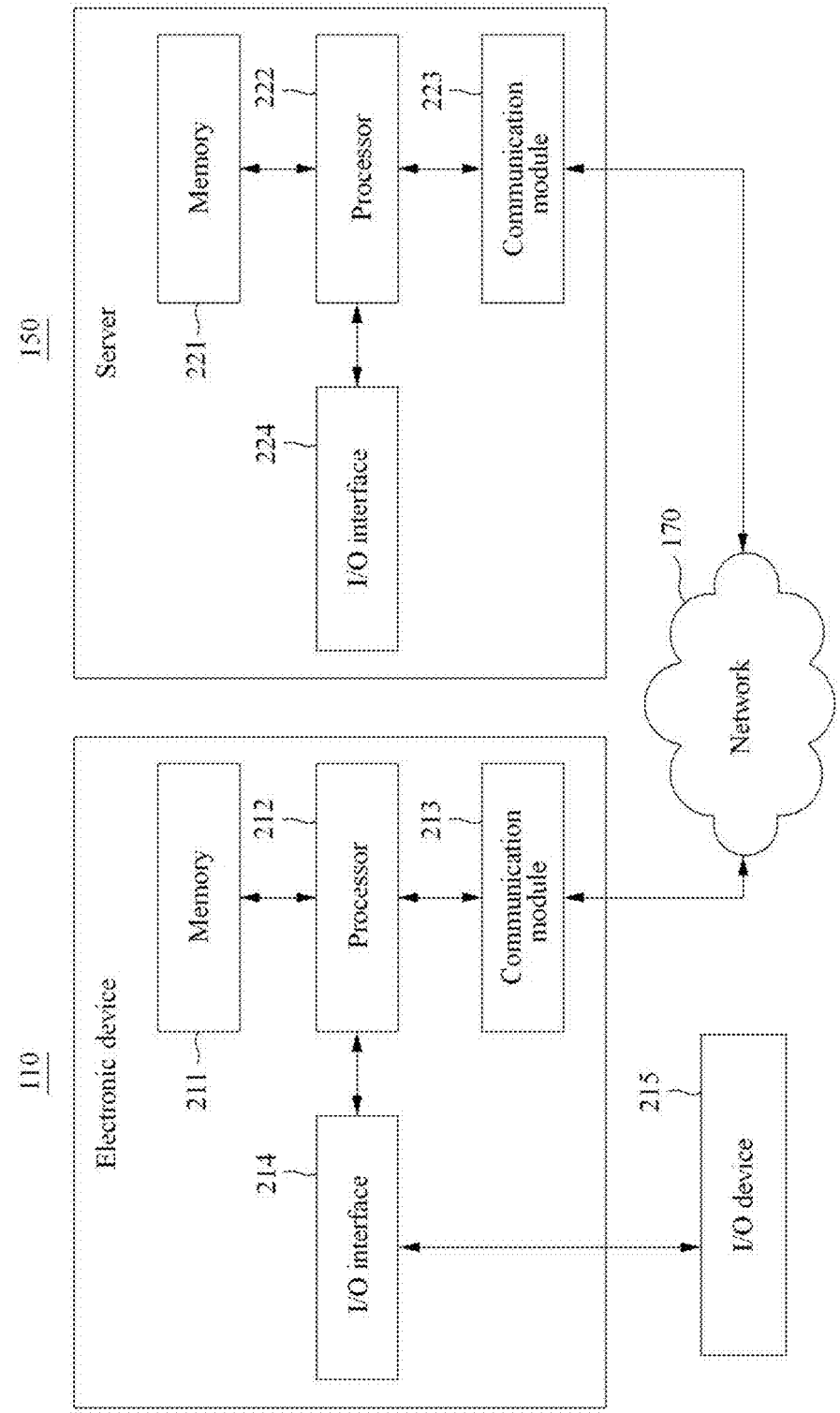
FIG. 2 is a block diagram illustrating a configuration of an electronic device and a server according to at least some example embodiments.

FIG. 2 is a block diagram illustrating a configuration of an electronic device and a server according to at least some example embodiments. FIG. 2 illustrates a configuration of the electronic device 110 representative of a single electronic device and illustrates a configuration of the server 150 representative of a single server.

Referring to FIG. 2, the electronic device 110 may include a memory 211, at least one processor 212, a communication module 213, and an input/output (I/O) interface 214, etc., and the server 150 may include a memory 221, at least one processor 222, a communication module 223, and an I/O interface 224, etc. The memory 211 and/or memory 221 may include random access memory (RAM) and/or a permanent mass storage device, such as read only memory (ROM), a magnetic or optical disk drive, a non-volatile solid state drive, etc., as a computer-readable storage medium. Here, ROM and the permanent mass storage device may be included using a separate permanent storage device, separate from the memory 211 and/or memory 221. Also, an OS and at least one program code, such as, the aforementioned code for browser or the application installed and executed on the electronic device 110, may be stored in the memory 211 and/or memory 221. Such software constituent elements may be loaded from another computer-readable storage medium separate from the memory 211 and/or memory 221 using a drive mechanism. The other computer-readable storage medium may include, such as, a floppy drive, a disk, a tape, a DVD/CD-ROM/Blu-ray drive, a memory card, etc. According to at least some example embodiments, software constituent elements may be loaded to the memory 211 and/or memory 221 through the communication module 213 and/or communication module 223, instead of, or in addition to, the computer-readable storage medium. In at least some example embodiments, at least one program may be loaded to the memory 211 and/or memory 221 based on a program, such as, the application, installed by files provided over the network 170 from developers or a file distribution system, such as, the server 160, that provides an installation file of the application.

The processor 212 and/or processor 222 may be configured to process computer-readable instructions, such as, the aforementioned at least one program code, of a computer program by performing basic arithmetic operations, logic operations, and I/O operations. The computer-readable instructions may be provided from the memory 211 and/or memory 221 and/or the communication module 213 and/or communication module 223 to the processor 212 and/or processor 222. In at least some example embodiments, the processor 212 and/or processor 222 may be configured to execute received instructions in response to the program code stored in the storage device, such as the memory 211 and/or memory 221.

The communication module 213 and/or communication module 223 may be embodied, for example, by circuits or circuitry or, alternatively, at least one processor executing program code including instructions corresponding to any or all operations described herein as being performed by the communication module 213 and/or communication module 223. The communication module 213 and/or communication module 223 may provide a function for communication between the electronic device 110 and the server 150 over the network 170, and may provide a function for communication with another electronic device, such as, the electronic device 120 or another server, such as, the server 160. In at least some example embodiments, the processor 212 of the electronic device 110 may transfer a request, such as, a request for a video call service, generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. In at least some example embodiments, a control signal, an instruction, etc., of the server 150 received through the communication module 213 may be transferred to the processor 212 or the memory 211, and content, a file, etc., may be stored in a storage medium further includable in the electronic device 110.

The I/O interface 214 and/or I/O interface 224 may be a device (e.g., a circuit and/or at least one processor executing firmware) that interfaces with an I/O device 215. According to at least some example embodiments, the I/O device 215 is, or includes, an input device and/or an output device. In at least some example embodiments, such input devices include, but are not limited to, a keyboard, a mouse, a touch panel, a microphone, a camera, etc. In at least some example embodiments, such output devices include, but are not limited to, a device, such as a display (e.g., a touch screen, liquid crystal display (LCD)), for displaying a communication session of an application, a speaker, a haptic feedback device, etc. In at least some example embodiments, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to at least some example embodiments, the electronic device 110 and the server 150 may include a greater or lesser number of constituent elements than the number of constituent elements shown in FIG. 2. In at least some example embodiments, the electronic device 110 may include at least a portion of the I/O device 215, or may further include other constituent elements, such as, a transceiver, a global positioning system (GPS) module, a camera, a variety of sensors, a database, and the like. In detail, if the electronic device 110 is a smartphone, the electronic device 110 may further include various constituent elements, such as an accelerometer or a gyro sensor, a camera, various physical buttons, a button using a touch panel, an I/O port, a vibration motor for vibration, etc., that are generally included in the smartphone.

The other electronic devices 120, 130, and/or 140 or the server 160 may have the same or similar configuration. In at least some example embodiments, similar to or the same as the server 150, the server 160 may include the memory 221, the processor 222, the communication module 223, and the I/O interface 224. In at least some example embodiments, the processor 222 of the server 160 may operate different from the processor 222 of the server 150.

Figure 3:
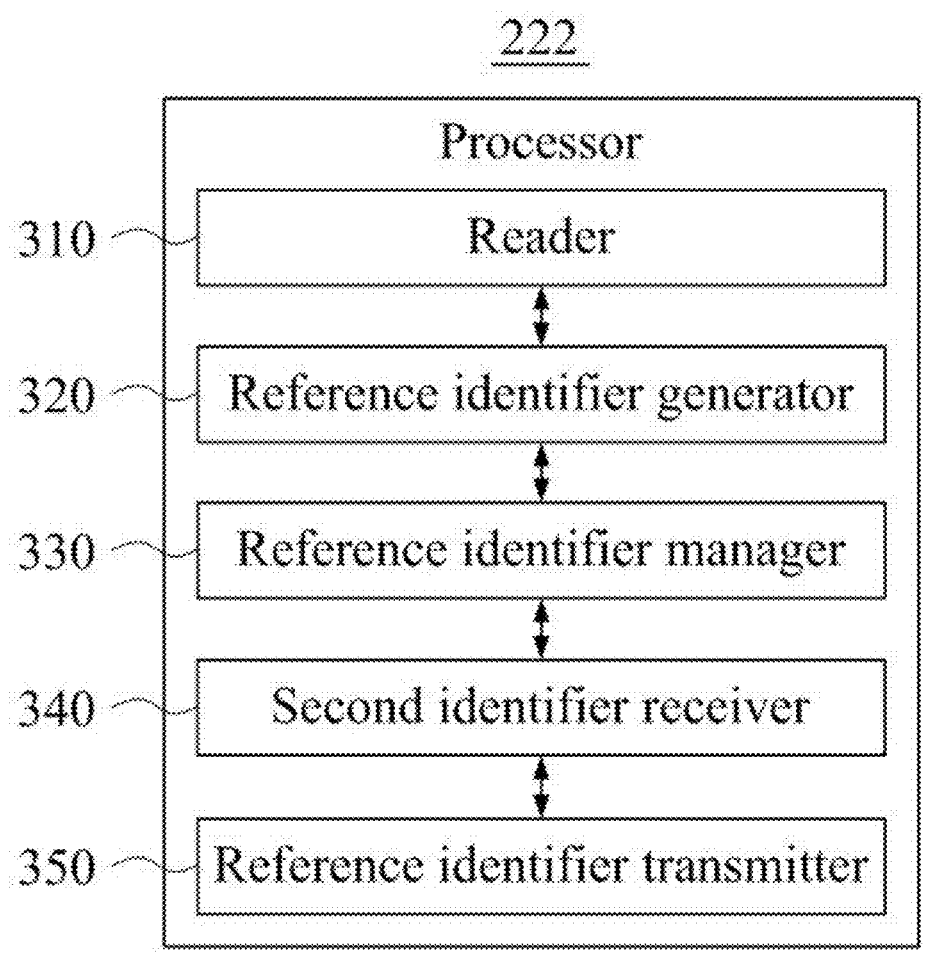
FIG. 3 is a block diagram illustrating constituent elements included in at least one processor of a first server for generating and sharing a reference identifier according to at least some example embodiments.
Figure 4:
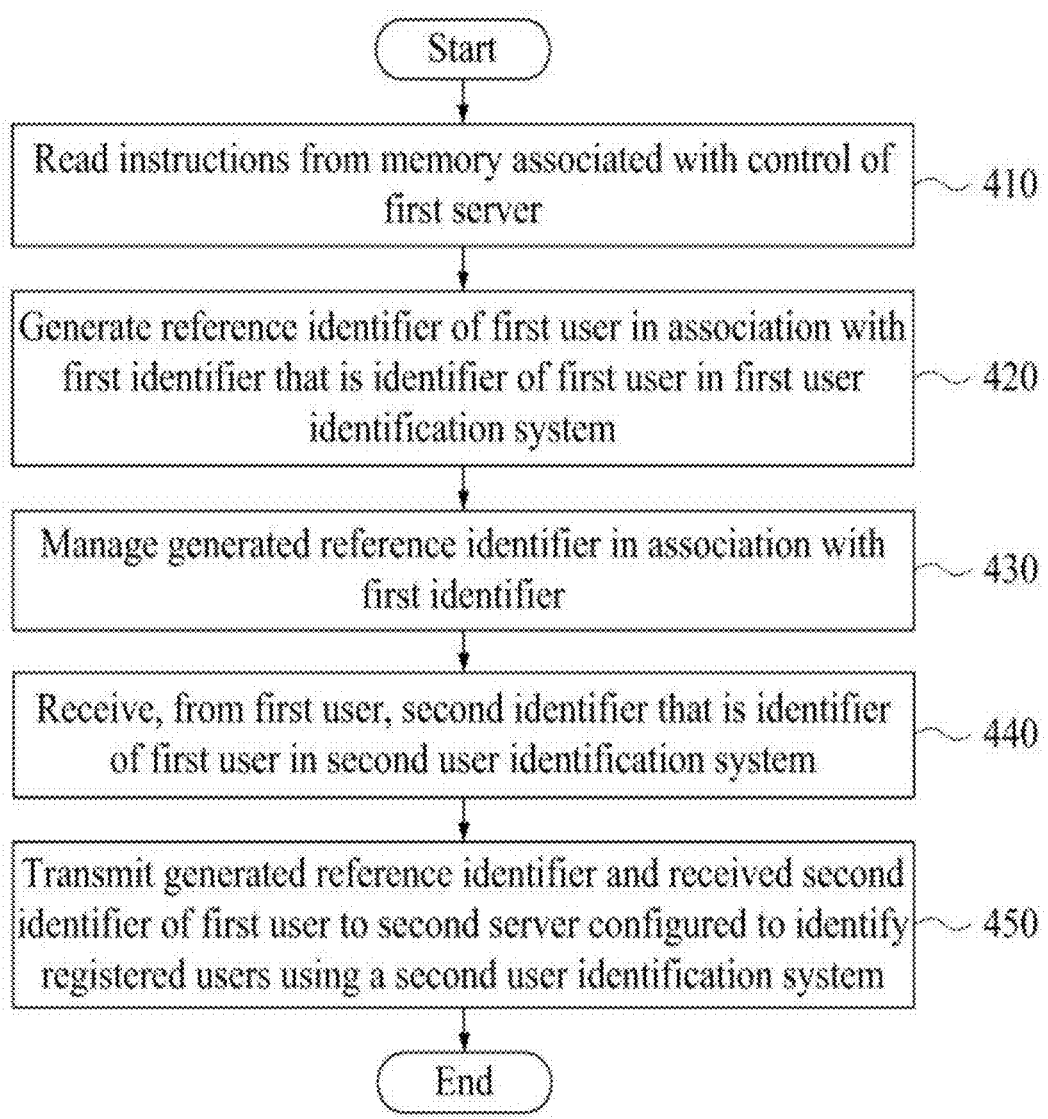
FIG. 4 is a flowchart illustrating methods performed at a first server for generating and sharing a reference identifier according to at least some example embodiments.

FIG. 3 is a block diagram illustrating constituent elements included in at least one processor of a first server for generating and sharing a reference identifier according to at least some example embodiments, and FIG. 4 is a flowchart illustrating methods performed at a first server for generating and sharing a reference identifier according to at least some example embodiments.

The processor 222 of FIG. 3 refers to the processor 222 included in the server 150 and may embody service interworking systems according to at least some example embodiments. Referring to FIG. 3, the processor 222 included in the server 150 may include a reader 310, a reference identifier generator 320, a reference identifier manager 330, a second identifier receiver 340, and a reference identifier transmitter 350 as constituent elements. According to at least some example embodiments, operations described herein as being performed by any or all of the reader 310, the reference identifier generator 320, the reference identifier manager 330, the second identifier receiver 340, and the reference identifier transmitter 350 may be performed by at least one processor (e.g., the processor 222) executing program code that includes instructions corresponding to the operations. The instructions may be stored in a memory of the server 150 (e.g., the memory 221). The term 'processor', as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The processor 222 and the constituent elements of the processor 222 (e.g., the reader 310, the reference identifier generator 320, the reference identifier manager 330, the second identifier receiver 340, and the reference identifier transmitter 350) may be elements of the server 150 that are controlled by the processor 222 to perform operations 410 through 450 included in service interworking methods of FIG. 4. Here, the processor 222 and the constituent elements of the processor 222 may be configured to execute instructions according to a code of at least one program and a code of an OS included in the memory 221. The constituent elements of the processor 222 may be representations of different functions of the processor 222 performed at the processor 222, in response to control instructions provided from the program code stored in the server 150. In at least some example embodiments, the reader 310 may be employed as a functional representation of the processor 222 that controls the server 150 to read the instructions loaded to the memory 221 in response to the control instruction. Here, the server 150 may refer to a first server and the server 160 may refer to a second server. They may be interchangeably used throughout.

In operation 410, the reader 310 may read instructions from the memory 221 to which instructions associated with control of the server 150 are loaded. In this case, the read instructions may include an instruction for controlling the processor 222 to perform operations 420 through 450.

In operation 420, the reference identifier generator 320 may generate a reference identifier of a first user in association with a first identifier that is an identifier of the first user in a first user identification system. Here, the first user identification system may be a user identification system used at the server 150 to identify users. In at least some example embodiments, the server 150 may generate a reference identifier "abc" that is a separate identifier in association with a first identifier "AAA" of user A. In this case, for service interworking with another service, the server 150 may generate a reference identifier with respect to each of first identifiers of users associated with service interworking.

In operation 430, the reference identifier manager 330 may manage the generated reference identifier in association with the first identifier. In at least some example embodiments, the reference identifier manager 330 may control the server 150 to manage a reference identifier by associating and storing the first identifier "AAA" and the reference identifier "abc" of the user A. In this case, the server 150 may generate and manage reference identifiers of the respective users associated with service interworking. The reference identifiers may be stored and managed in a user database configured to manage information about the users in association with the respective corresponding first identifiers. The user database may be included in the server 150, or may be included in a separate apparatus that communicates with the server 150 over the network 170.

In operation 440, the second identifier receiver 340 may receive, from the first user, a second identifier that is an identifier of the first user in a second user identification system. Here, the second user identification system may be a user identification system used at the server 160 to identify users. In at least some example embodiments, the second identifier receiver 340 may control the server 150 to receive the second identifier from a terminal of the first user over the network 170.

In operation 450, the reference identifier transmitter 350 may transmit the generated reference identifier and the received second identifier of the first user to the server 160 configured to identify registered users using the second user identification system. In at least some example embodiments, the reference identifier transmitter 350 may control the server 150 to transmit the second identifier and the reference identifier to the server 160 over the network 170.

The server 150 may receive, from the first user, the second identifier that is registered by the first user to a service of the server 160 in operation 440, and may transmit the second identifier and the reference identifier to the server 160 in operation 450. In this manner, a reference identifier of a specific user may be shared between the server 150 serving as the first server and the server 160 serving as the second server without communication about or sharing personal information, such as a phone number, a social security number, a resident registration number, an address, ID card number, and/or a credit card number of the specific user, etc. Accordingly, service interworking associated with the specific user may be processed using the reference identifier shared between the server 150 and the server 160, and a variety of service requests may be processed without communication about or sharing personal information between the server 150 and the server 160.

To this end, the server 160 that receives the second identifier and the reference identifier may identify the first user based on the second identifier and may manage the reference identifier in association with the first user. In at least some example embodiments, the reference identifier and the second identifier of the first user may be stored and managed in a user database of the server 160 through mutual association. The user database of the server 160 may also be included in the server 160, or may be included in a separate apparatus that communicates with the server 160 over the network 170.

Figure 5:
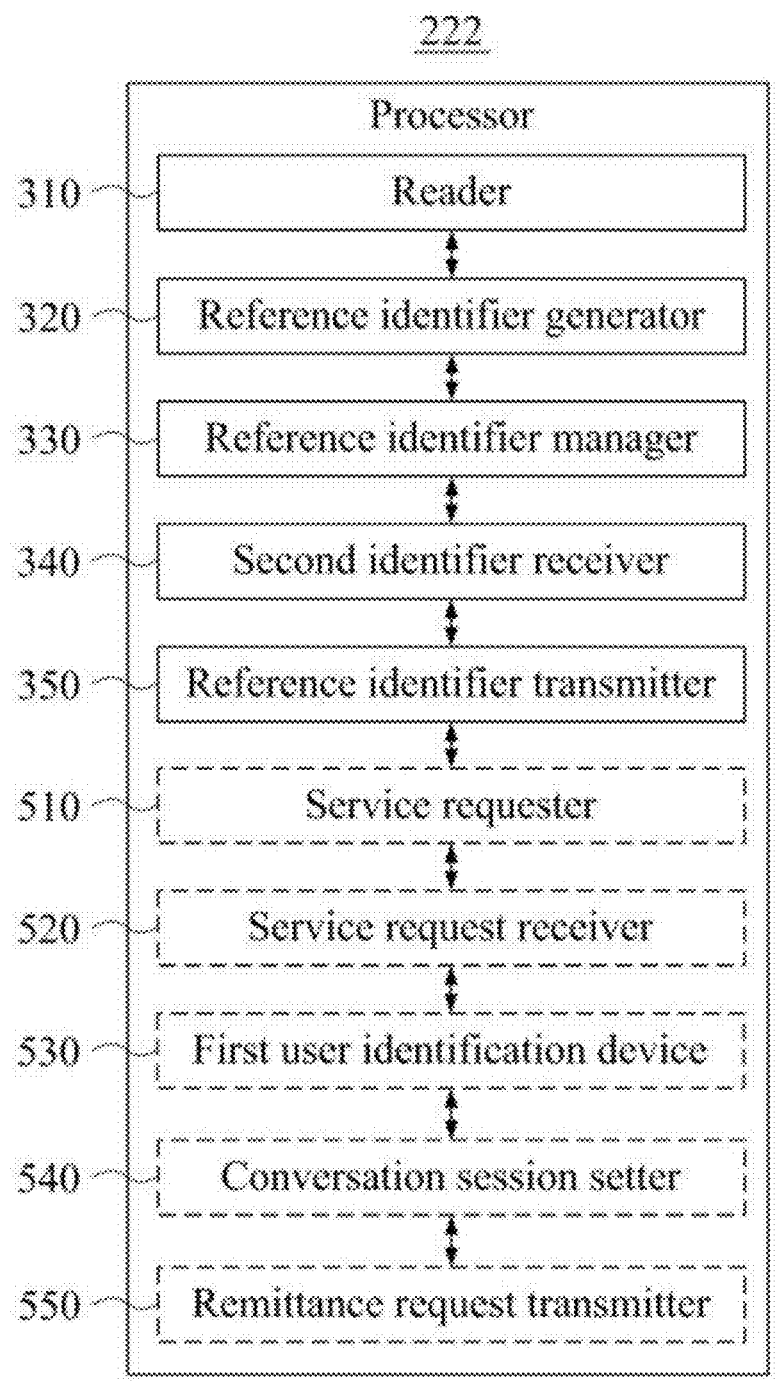
FIG. 5 is a block diagram illustrating additional constituent elements further included in at least one processor of a first server for requesting and facilitating services according to at least some example embodiments.
Figure 6:
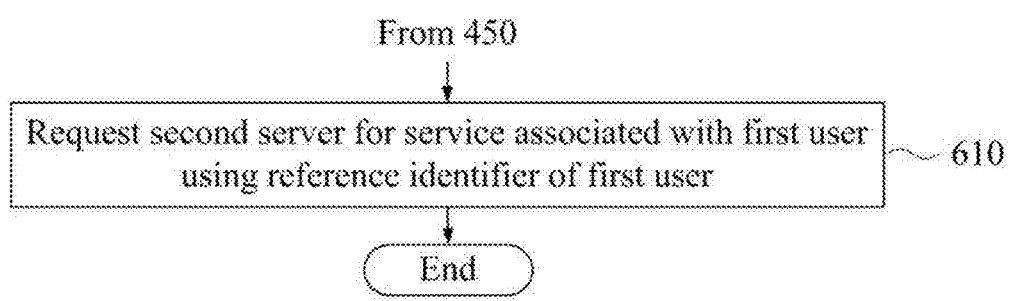
FIGS. 6 through 8 are flowcharts illustrating methods performed at a first server for requesting and facilitating services according to at least some example embodiments.
Figure 7:
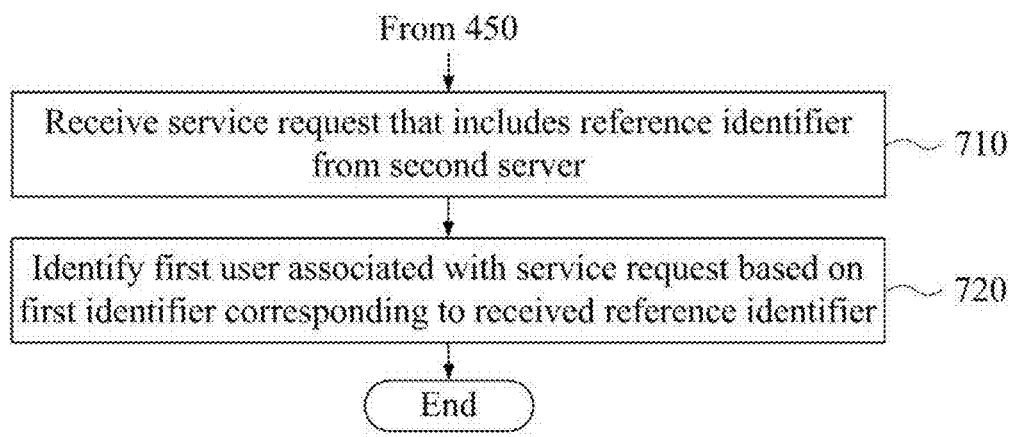
Figure 8:
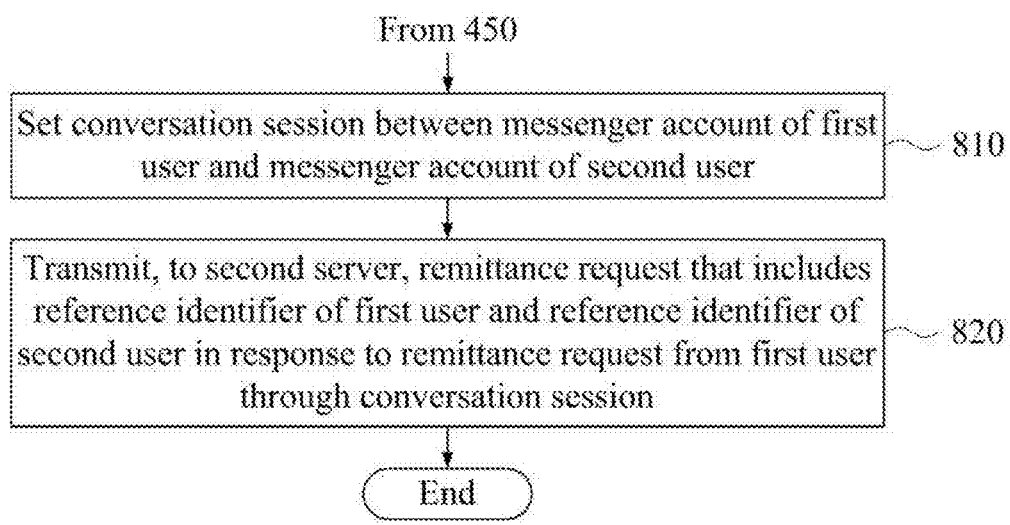

FIG. 5 is a block diagram illustrating additional constituent elements further included in at least one processor of a first server for requesting and facilitating services according to at least some example embodiments, and FIGS. 6 through 8 are flowcharts illustrating other methods performed at a first server for requesting and facilitating services according to at least some example embodiments.

Referring to FIG. 5, the processor 222 of the server 150 described with FIG. 3 may further include at least one of a service requester 510, a service request receiver 520, a first user identification device 530, a conversation session setter 540, and a remittance request transmitter 550. According to at least some example embodiments, operations described herein as being performed by any or all of the service requester 510, the service request receiver 520, the first user identification device 530, the conversation session setter 540, and the remittance request transmitter 550 may be performed by at least one processor (e.g., the processor 222) executing program code that includes instructions corresponding to the operations. The instructions may be stored in a memory of the server 150 (e.g., the memory 221). FIG. 5 is provided as an example only and thus, at least some example embodiments are not limited thereto and the number of constituent elements is not limited thereto and the processor 222 may contain more or less constituent elements. As described above, the constituent elements of the processor 222 (e.g., the service requester 510, the service request receiver 520, the first user identification device 530, the conversation session setter 540, and the remittance request transmitter 550) may be representations of different functions of the processor 222 performed at the processor 222, in response to control instructions provided from a program code stored in the server 150.

FIGS. 6 through 8 show processes followed by operation 450 of FIG. 4 and may represent operations selectively performed at the processor 222 depending on example embodiments.

In operation 610 of FIG. 6, the service requester 510 may request the server 160 for a service associated with the first user using the reference identifier of the first user. In at least some example embodiments, the service requester 510 requesting the server 160 for a service may be conditioned on the existence of an association between a first service provided from the server 150 and a second service provided from the server 160 in association with the first user. Here, since the reference identifier of the first user is shared between the server 150 and the server 160 through operations 410 through 450, the service requester 510 may control the server 150 to request the server 160 for a second service of the server 160 associated with the first user using the reference identifier of the first user. In at least some example embodiments, a service request message that includes the reference identifier of the first user may be transmitted from the first server 150 to the second server 160. The service request message may include information regarding the requested service together with the reference identifier of the first user. In this case, the second server 160 may identify the first user to apply the requested service based on the reference identifier included in the service request message and may apply or provide the requested service to the first user. Accordingly, service interworking for the first user is enabled without communication about or sharing personal information of the first user between the server 150 and the server 160.

In operation 710 of FIG. 7, the service request receiver 520 may receive a service request that includes the reference identifier from the server 160. As described with FIG. 6, the server 150 may request the server 160 for a service. Inversely, the server 160 may request the server 150 for a service associated with the first user. In this case, the server 160 may transmit a service request message that includes the reference identifier of the first user to the server 150 over the network 170. The service request receiver 520 may control the server 150 to receive the service request message.

In operation 720 of FIG. 7, the first user identification device 530 may identify the first user associated with the service request based on the first identifier corresponding to the received reference identifier. As described above, the server 150 may store and manage the reference identifier and the first identifier of the first user through mutual association in operation 430 of FIG. 4. The server 150 may obtain the first identifier corresponding to the reference identifier of the service request message and may identify the first user associated with the service request. Once the first user is identified, the server 150 may apply or provide the requested service to the first user.

Methods of providing a requested message to the first user may vary based on types or methods of services provided from at least one of the servers 150 and 160. In at least some example embodiments, methods of identifying the first user for service interworking without sharing personal information of the first user between the server 150 and the server 160 is described instead of describing methods of applying or providing an interworking service.

Hereinafter, at least some example embodiments are described in further detail.

According to at least some example embodiments, the first user identification system used at the server 150 may include a system configured to identify the first user registered to a messenger service provided from the server 150 by employing a messenger identifier of the messenger service as a first identifier. Also, the second user identification system used at the server 160 may include a system configured to identify the first user registered to a payment service provided from the server 160 by employing, as a second identifier, a telephone number of the first user registered for the payment service, such as, a service for processing deposit, withdrawal, remittance, payment, reference, change, and the like about accounts of users). According to at least some example embodiments, operations described herein as being performed by any or all of the messenger service and the payment service may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

According to at least some example embodiments, all of the first user identification system and the second user identification system may use a registered telephone number of the first user. However, a telephone number registered to the server 150 by the first user may differ from a telephone number registered to the server 160 by the first user.

The reference identifier may be generated at the server 150 not to include personal information of the first user, and the first identifier for service interworking may be identified based on the reference identifier generated in association with the first user without communication about or sharing personal information of the first user between the server 150 and the server 160.

In operation 810 of FIG. 8, the conversation session setter 540 may set a conversation session between a messenger account of the first user and a messenger account of the second user. In at least some example embodiments of the messenger service, the conversation session setter 540 may control the server 150 to set and provide a conversation session such as a messenger chatroom to users, and the server 150 may provide the messenger service to users that participate in the conversation session by routing instant messages transmitted and received through the set conversation session. The messenger service of the server 150 may interwork with the payment service of the server 160. In at least some example embodiments, the first user may be a user that communicates with the server 150 through the electronic device 110, and the second user may be a user that communicates with the server 150 through the electronic device 120. The first user and the second user are assumed to be service users registered to the messenger service provided from the server 150. The server 150 may open a messenger chatroom for the first user and the second user. Once instant messages input from the first user and the second user at the messenger chatroom are transmitted using the electronic devices 110 and 120, the server 150 may receive the instant message and route the instant messages to be delivered to their destinations.

In operation 820 of FIG. 8, in response to a remittance request from the first user through the conversation session, the remittance request transmitter 550 may transmit, to the server 160, the remittance request that includes the reference identifier of the first user and the reference identifier of the second user. In at least some example embodiments, the server 150 may provide a user interface for remittance to the first user through the messenger chatroom. The first user may request the second user participating in the messenger chatroom together with the first user for the remittance through the user interface. A remittance request message generated in response to the remittance request may be transmitted to the server 150. In response to the remittance request message, the server 150 may transmit the remittance request that includes the reference identifier of the first user and the reference identifier of the second user to the server 160. In this case, the server 160 may identify the first user as a remitter based on the reference identifier of the first user, may identify the second user as a remittee based on the reference identifier of the second user, and may process the remittance by transferring a requested amount from an account of the remitter to an account of the remittee. In detail, the server 150 may transmit, to the server 160 over the network 170, the remittance request message that includes the reference identifier of the first user as information about the remitter, includes the reference identifier of the second user as information about the remittee, and includes an amount as a requested remittance amount.

As described above, since separate reference identifiers for users are generated and shared between the server 150 and the server 160 using different user identification systems, users associated with service interworking may be identified without communication about or sharing personal information of the users between the server 150 and the server 160.

Figure 9:
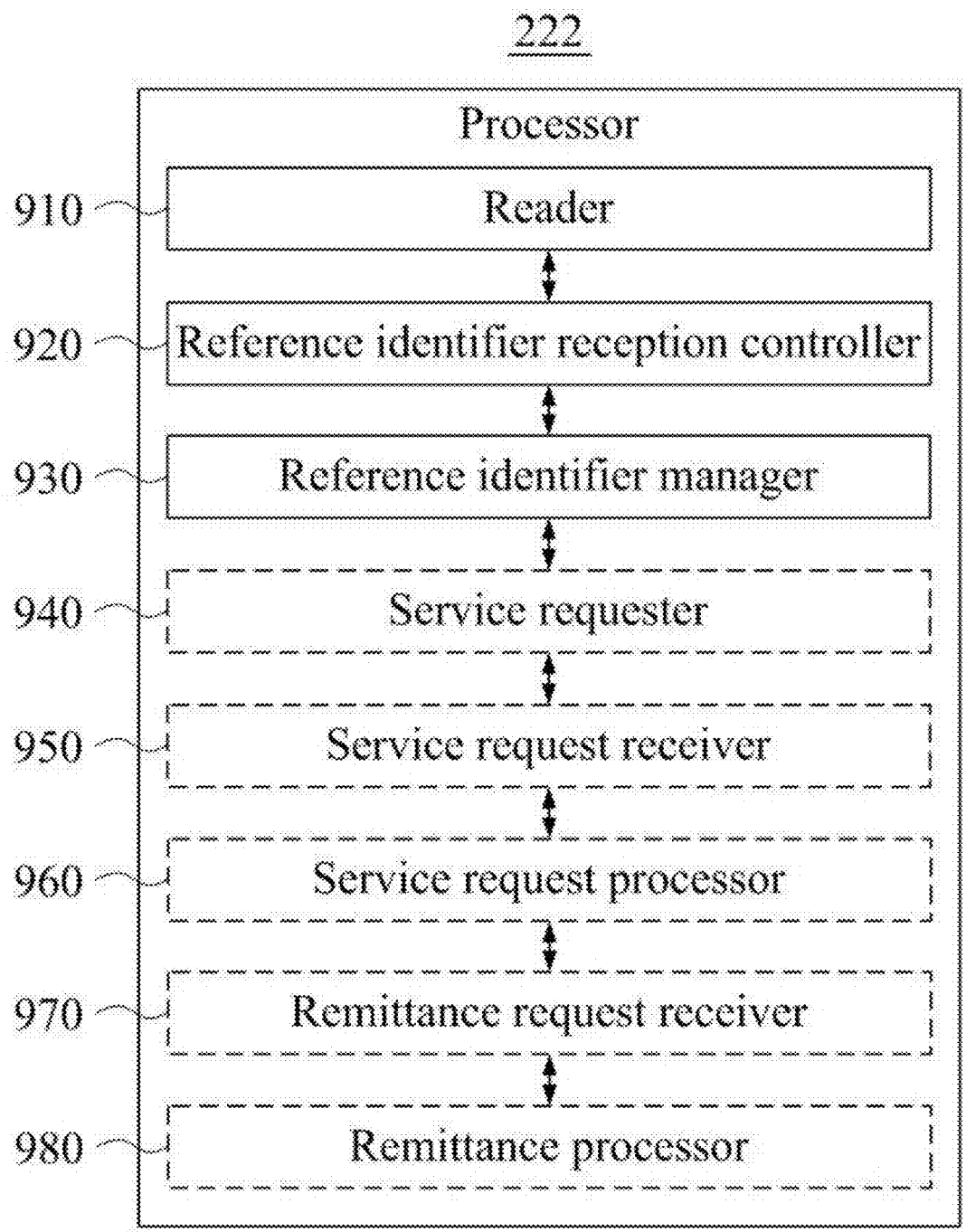
FIG. 9 is a block diagram illustrating constituent elements included in at least one processor of a second server for receiving and using a reference identifier to request and facilitate services according to at least some example embodiments.

FIG. 9 is a block diagram illustrating constituent elements included in at least one processor of a second server for receiving and using a reference identifier to request and facilitate services according to at least some example embodiments, and FIGS. 10 through 13 are flowcharts illustrating methods performed at a second server for receiving and using a reference identifier to request and facilitate services according to at least some example embodiments. Service interworking systems and service interworking methods will be described in perspective from the server 160 with reference to FIGS. 9 through 13.

As described above, the server 160 also may include the memory 221, the processor 222, the communication module 223, and the I/O interface 224. For simplicity of description, like reference numerals refer to like constituent elements with respect to the server 150 and the server 160. However, the constituent elements of the server 150 and the constituent elements of the server 160 may be physically different constituent elements.

Referring to FIG. 9, the processor 222 of the server 160 may include a reader 910, a reference identifier reception controller 920, and a reference identifier manager 930, and may further include at least one of a service requester 940, a service request receiver 950, a service request processor 960, a remittance request receiver 970, and a remittance processor 980. According to at least some example embodiments, operations described herein as being performed by any or all of the reader 910, the reference identifier reception controller 920, the reference identifier manager 930, the service requester 940, the service request receiver 950, the service request processor 960, the remittance request receiver 970, and the remittance processor 980 may be performed by at least one processor (e.g., the processor 222) executing program code that includes instructions corresponding to the operations. The instructions may be stored in a memory of the server 160 (e.g., the memory 221). As described above, the constituent elements of the processor 222 (e.g., the reader 910, the reference identifier reception controller 920, the reference identifier manager 930, the service requester 940, the service request receiver 950, the service request processor 960, the remittance request receiver 970, and the remittance processor 980) may be representations of different functions of the processor 222 performed at the processor 222, in response to control instructions provided from a program code stored in the server 160.

Figure 10:
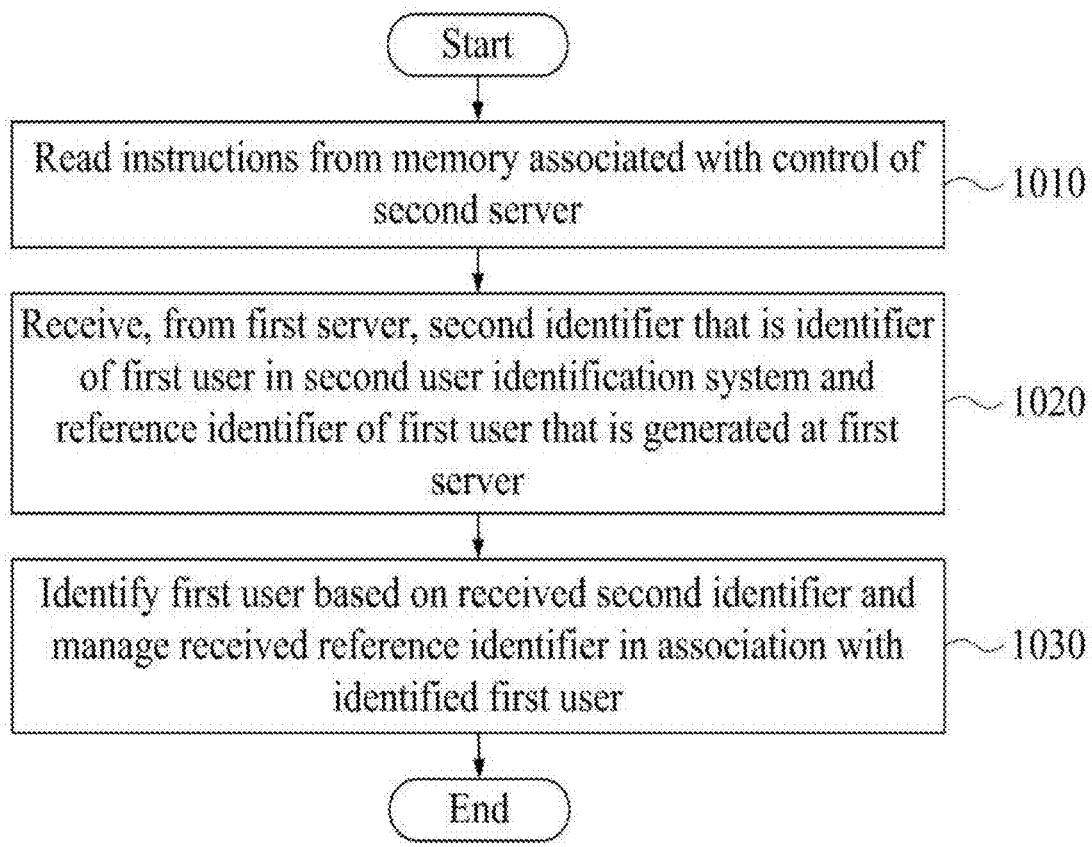
FIGS. 10 through 13 are flowcharts illustrating methods performed at a second server for receiving and using a reference identifier to request and facilitate services according to at least some example embodiments.

In operation 1010 of FIG. 10, the reader 910 may read instructions from the memory 221 to which instructions associated with a control of the server 160 are loaded. In this case, the read instructions may include an instruction for controlling the processor 222 to perform operations 1020 and 1030.

In operation 1020, the reference identifier reception controller 920 may receive, from the server 150, a second identifier that is an identifier of a first user in a second user identification system and a reference identifier of the first user that is generated at the server 150. As described above, the server 150 may identify registered users using a first user identification system and the server 160 may identify registered users using the second user identification system. For the servers 150 and 160 using different user identification systems, reference identifiers of users associated with a single server, such as, the server 150, may be generated and be transmitted to the server 160 and thereby be shared. Here, the server 150 may transmit the second identifier received from the first user to the server 160 together with the reference identifier, so that the server 160 may recognize the reference identifier. The reference identifier reception controller 920 may control the server 160 to receive the transmitted second identifier and reference identifier.

In operation 1030, the reference identifier manager 930 may identify the first user based on the received second identifier and may manage the received reference identifier in association with the identified first user. In at least some example embodiments, the reference identifier manager 930 may control the server 160 to store and manage the reference identifier in association with the second identifier of the first user in a user database that is included in the server 160 or included in a separate apparatus communicating with the server 160 over the network 170.

Here, the server 150 may identify the first user based on the first identifier of the first user in the first user identification system and may store and manage the first identifier and the reference identifier of the first user through mutual association. Accordingly, the servers 150 and 160 using different user identification systems may commonly identify the same user based on the reference identifier.

Figure 11:
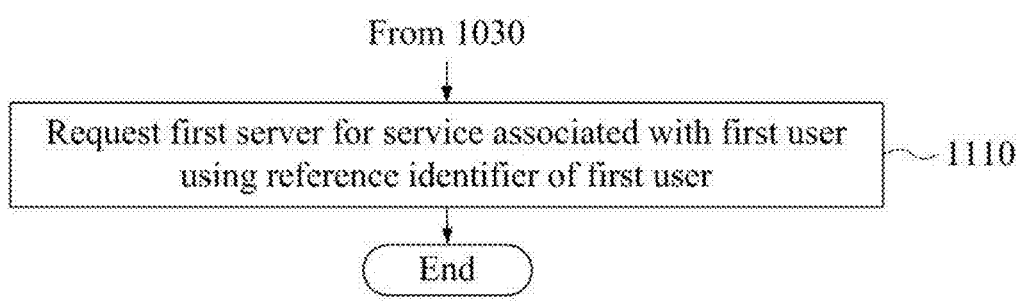

In operation 1110 of FIG. 11, the service requester 940 may request the server 150 for a service associated with the first user using the reference identifier of the first user. In at least some example embodiments, the service requester 940 may control the server 160 to transmit a service request message that includes the reference identifier to the server 150 over the network 170 for interworking with a service of the server 150. The service request message may be received at the server 150 in operation 710 of FIG. 7. The server 150 may acquire the first identifier by searching the user database based on the reference identifier included in the service request message, and may identify the first user associated with service interworking based on the first identifier. Operation 1110 of FIG. 11 may be implemented for the server 160 to request the server 150 for service interworking.

Figure 12:
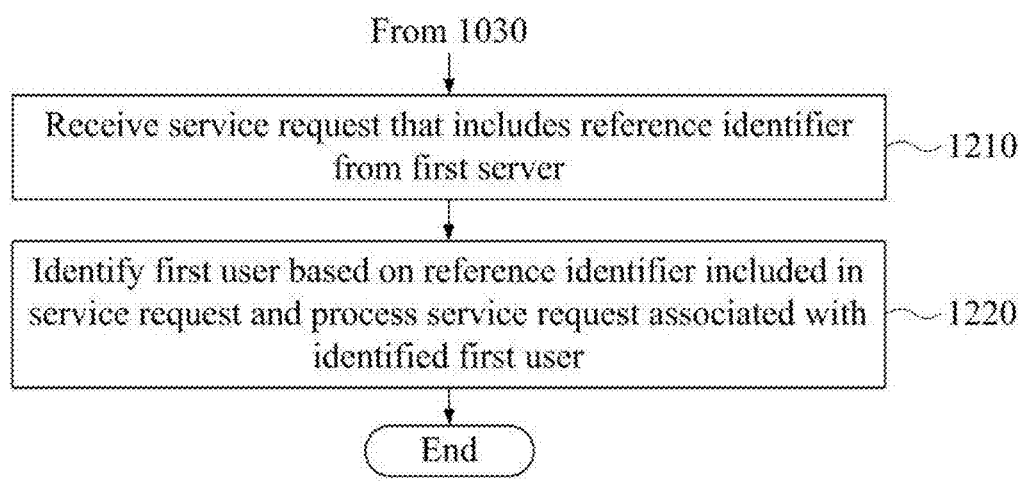

In operation 1210 of FIG. 12, the service request receiver 950 may receive a service request that includes a reference identifier from the server 150. In at least some example embodiments, the service request receiver 950 may control the server 160 to receive a service request message transmitted from the server 150 over the network 170. Here, the service request message may include the reference identifier of the first user. In at least some example embodiments, in operation 610 of FIG. 6, the service request message may be generated at the server 150 in response to the service request from the server 150.

In operation 1220, the service request processor 960 may identify the first user based on the reference identifier included in the service request and may process the service request associated with the identified first user.

As described above, the server 150 may provide a messenger service and the server 160 may provide a payment service.

Figure 13:
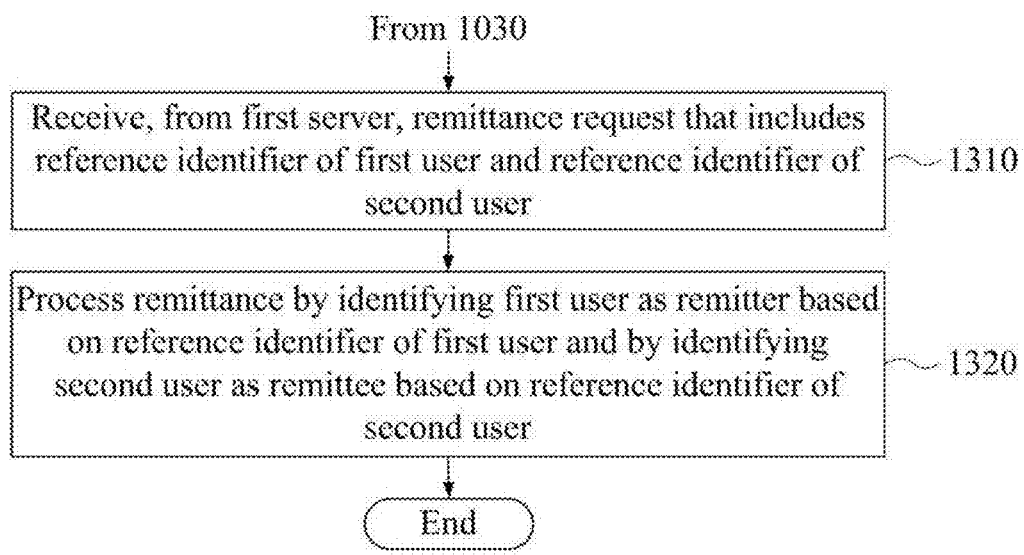

In operation 1310 of FIG. 13, the remittance request receiver 970 may receive, from the server 150, a remittance request that includes the reference identifier of the first user and the reference identifier of the second user. The remittance request may be generated at the server 150 in response to the remittance request from the first user through a conversation session set between a messenger account of the first user and a messenger account of the second user, and may be transferred to the server 160. In at least some example embodiments, the server 150 may generate a remittance request message that includes the reference identifier of the first user as a remitter, includes the reference identifier of the second user as a remittee, and further includes a remittance amount, and may transmit the remittance request message to the server 160 over the network 170. In this case, the remittance request receiver 970 may control the server 150 to receive the remittance request message transmitted from the server 150.

In operation 1320, the remittance processor 980 may process a remittance by identifying the first user as the remitter based on the reference identifier of the first user and by identifying the second user as the remittee based on the reference identifier of the second user. In at least some example embodiments, the server 160 may process the remittance request from the first user in association with the messenger service of the server 150 by transferring a requested amount from an account of the first user identified as the remitter to an account of the second user identified as the remittee under control of the remittance processor 980.

Hereinafter, at least some example embodiments for service interworking will be further described. The following situations are assumed herein:

1) A situation in which a first company of a first country provides a messenger service and a first payment service through a first server, such as the server 150, and a second company of a second country provides a second payment service through a second server, such as the server 160, is assumed. According to at least some example embodiments, operations described herein as being performed by any or all of the messenger service, the first payment service and the second payment service may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

2) A situation in which the first company is to make an affiliation with the second company to provide the first payment service of the first company without establishing a corporation or acquiring a license in the second country is assumed. That is, a situation of providing a service in the name of the first payment service of the first company and processing a substantial remittance through the second payment service of the second company is assumed.

3) A situation in which the first server of the first company and the second server of the second company interwork with each other through application programming interface (API) communication and use different identification systems is assumed. In at least some example embodiments, the first company may process a user request, such as deposit, withdrawal, remittance, reference, and change, by identifying a user based on a messenger identifier of the messenger service, whereas the second company may process a user request, such as deposit, withdrawal, remittance, reference, and change, by identifying a user based on a telephone number.

4) In this situation, the first company and the second company may not communicate with each other using an identifier of a counter party due to personal information protection and information matching issues. In at least some example embodiments, a first server, such as the server 150, may not receive and store personal information of users from a second server, such as the server 160, and may not guarantee that a telephone number of the first user registered to the first server corresponds to a telephone number of the first user registered to the second server. The first server may use a telephone number of a phone directory stored in a mobile terminal of the first user or a telephone number directly input from the first user.

Here, the first server may generate a reference identifier of the first user, may share the generated reference identifier with the second server, and may commonly identify the first user based on the reference identifier. To this end, the first server may share the same reference identifier for the same user with the second server by transmitting the generated reference identifier to the second server together with the second identifier input from the first user, such as, a telephone number registered as an identifier to the second server. Accordingly, service interworking between the first server and the second service may be enabled using the reference identifier.

Figure 14:
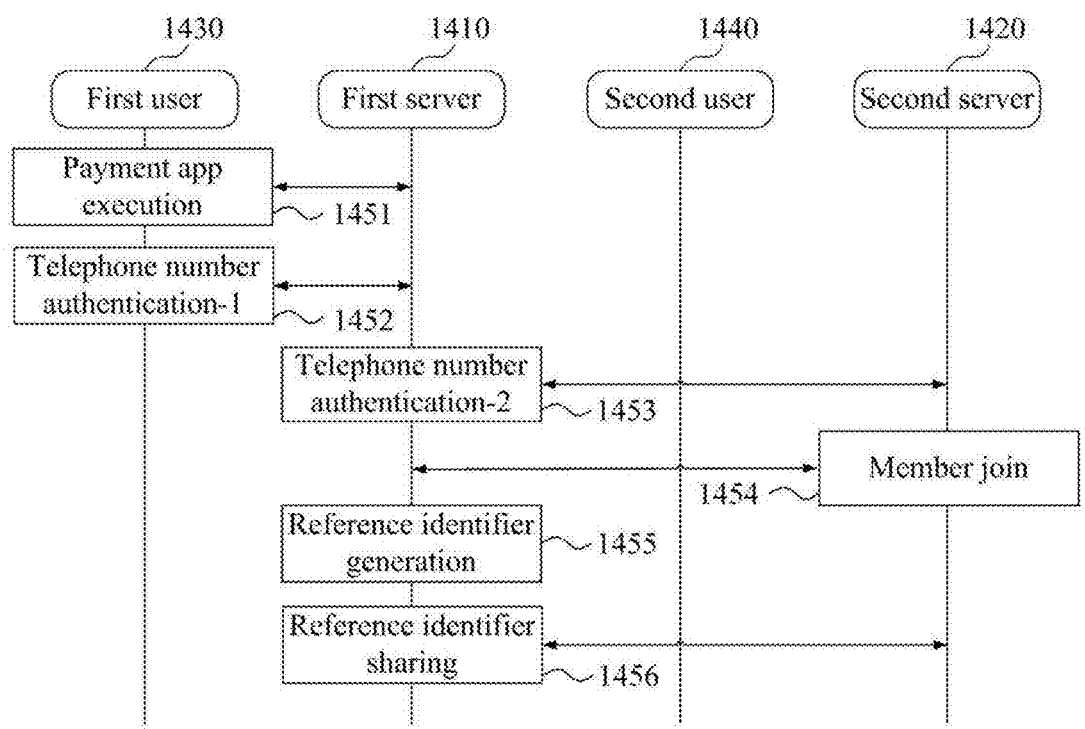
FIG. 14 is a diagram illustrating a process of generating and sharing a reference identifier of a first user for service interworking according to at least some example embodiments.

FIG. 14 is a diagram illustrating a process of generating and sharing a reference identifier of a first user for service interworking according to at least some example embodiments. FIG. 14 illustrates a first server 1410, a second server 1420, a first user 1430, and a second user 1440. In at least some example embodiments, the first server 1410 may correspond to the server 150, the second server 1420 may correspond to the server 160, the first user 1430 may correspond to the electronic device 110, and the second user 1440 may correspond to the electronic device 120 as described further in association with FIGS. 1 and 2.

In a payment app execution process 1451, in response to execution of an application (hereinafter, a "payment app" or a "payment application") for a first payment service of the first server 1410 on an electronic device, such as, the electronic device 110, of the first user 1430, the electronic device of the first user 1430 may connect to the first server 1410 under control of the payment app. If a reference identifier of the first user 1430 is not generated, the first server 1410 may generate the reference identifier of the first user 1430 and may proceed with the following processes, such as, 1452 through 1456, to share the reference identifier of the first user 1430 with the second server 1420.

If the reference identifier of the first user 1430 is already generated and shared between the first server 1410 and the second server 1420, the first server 1410 may provide a login function to the first user 1430 to process a login process, such as, a personal identification number (PIN) login, to a second payment service provided from the second server 1420 based on the reference identifier of the first user 1430. In at least some example embodiments, the first server 1410 may provide a function for logging in the second payment service of the second server 1420 through an API call to the first user 1430. The second payment service may be provided to the logged-in first user 1430 using the reference identifier shared between the first server 1410 and the second server 1420.

It is assumed in at least some example embodiments of FIG. 14 that the reference identifier of the first user 1430 is not generated yet.

In a telephone number authentication-1 process 1452, the first user 1430 may attempt an authentication by inputting a telephone number as the identifier of the first user 1430 in the second payment service provided from the second server 1420. In at least some example embodiments, the first server 1410 may provide a user interface for inputting a telephone number to the first user 1430. The user interface may be provided to the first user 1430 under control of the payment app executed on the electronic device of the first user 1430. The first user 1430 may input the telephone number through the user interface, and the input telephone number may be transmitted to the first server 1410 through the electronic device of the first user 1430.

In a telephone number authentication-2 process 1453, the first server 1410 may transmit the telephone number received from the first user 1430 to the second server 1420 to verify whether the first user 1430 is a user registered to the second payment service of the second server 1420. The second server 1420 may verify whether the first user 1430 is a user registered to the second payment service by searching a user database of the second server 1420 using the received telephone number and may transmit the verification result to the first server 1410.

If the first user 1430 is not a user registered to the second payment service, the first server 1410 may provide a function for joining the second payment service to the first user 1430 through API communication with the second server 1420.

In a member join process 1454, a function that enables the first user 1430 to be registered as a member of the second payment service may be provided. Here, a registration of the first user 1430 according to a member join procedure may be performed at the second server 1420. In at least some example embodiments, the first server 1410 may provide a user interface for joining the second payment service as a member to the first user 1430 through API call. Data input from the first user 1430 through the user interface may be transmitted to the second server 1420, and the second server 1420 may register the first user 1430 as a member of the second payment service based on the transmitted data.

In contrast, if the first user 1430 is already a member of the second payment service, the member join process 1454 may be omitted.

In a reference identifier generation process 1455, the first server 1410 may generate a reference identifier of the first user 1430. The reference identifier may be stored and managed in a user database of the first server 1410 in association with a first identifier used to identify the first user 1430.

In a reference identifier sharing process 1456, the first server 1410 may share the reference identifier with the second server 1420. In at least some example embodiments, the first server 1410 may transmit the telephone number input from the first user 1430 in the telephone authentication-1 process 1452 in association with the reference identifier. Here, the second server 1420 may identify the first user 1430 based on the received telephone number, and may store and manage the reference identifier in association with the first user 1430. In this manner, the reference identifier of the first user 1430 may be shared between the first server 1410 and the second server 1420.

In at least some example embodiments in which the payment app is executed on an electronic device of the second user 1440, the aforementioned processes of FIG. 14 may be performed in a similar or the same manner and a reference identifier of the second user 1440 may be shared between the first server 1410 and the second server 1420. According to at least some example embodiments, operations described herein as being performed by any or all of the payment app, the payment app execution process 1451, the first payment service, the login function, the login process, the second payment service, the telephone number authentication-1 process 1452, the telephone number authentication-2 process 1453, the member join process 1454, the reference identifier generation process 1455, and the reference identifier sharing process 1456 may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

Figure 15:
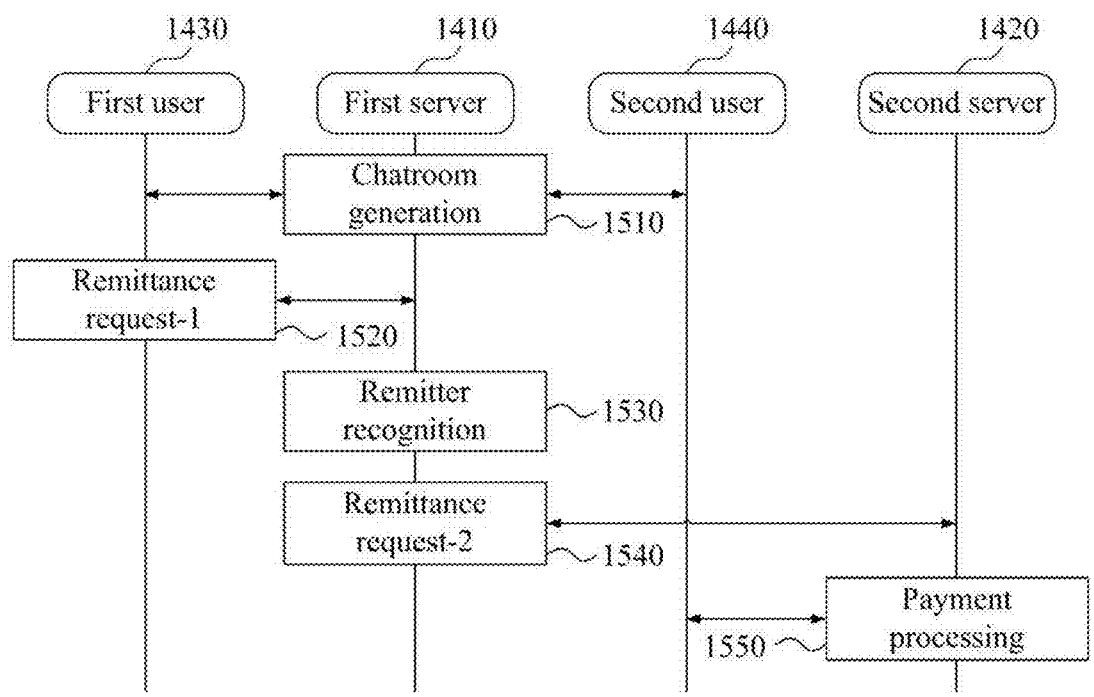
FIG. 15 is a diagram illustrating a process of facilitating a request from a first user in at chatroom using a reference identifier according to at least some example embodiments.

FIG. 15 is a diagram illustrating a process of facilitating a request from a first user in a chat room using a reference identifier according to at least some example embodiments. FIG. 15 illustrates a process of processing a service request from the first user 1430 of which the reference identifier is generated and shared through the processes of FIG. 14 for the second user 1440 through service interworking between the first server 1410 and the second server 1420. In particular, a process in which the first user 1430 requests the second user 1440 for a remittance through a messenger service will be described with reference to FIG. 15. In at least some example embodiments, the first server 1410 may correspond to the server 150, the second server 1420 may correspond to the server 160, the first user 1430 may correspond to the electronic device 110, and the second user 1440 may correspond to the electronic device 120 as described further in association with FIGS. 1 and 2.

In a chatroom generation process 1510, the first server 1410 may generate a chatroom for transmitting and receiving an instant message between the first user 1430 and the second user 1440. If a chatroom is already generated between the first user 1430 and the second user 1440, the chatroom may be used as is.

In a remittance request-1 process 1520, the first user 1430 may request the second user 1440 for a remittance using a user interface within the chatroom provided from the first server 1410. In at least some example embodiments, the chatroom may provide a user interface, such as an input box for inputting a remittance amount, a check button for receiving a remittance procedure, etc., and the first user 1430 may request the first server 1410 for a remittance using the provided user interface. The chatroom may further include a user interface for specifying a remittee. Alternatively, the second user 1440 that is an only counter party in the chatroom may be automatically specified as the remittee.

In a remittee recognition process 1530, the first server 1410 may recognize a remittee of the remittance request. In at least some example embodiments, although the second user 1440 using the messenger service is a member of the messenger service, whether the second user 1440 is a member of which a reference identifier is registered to the second payment service and shared may not be sure. Thus, the first server 1410 may verify whether the reference identifier of the second user 1440 is registered. In at least some example embodiments, the first server 1410 may conduct a search regarding whether the reference identifier and an identifier of the second user 1440 are associated with each other and thereby stored in the user interface of the first server 1410. If the reference identifier for the second user 1440 is shared, the second user 1440 may be identified based on the reference identifier. In contrast, if the reference identifier for the second user 1440 is not shared, the second user 1440 may be identified based on a telephone number selected from a phone directory stored in an electronic device of the first user 1430 or a telephone number input from the first user 1430. At least some example embodiments will be described in further detail with reference to FIG. 16.

In a remittance request-2 process 1540, the first server 1410 may request the second server 1420 for a remittance using the reference identifier of the first user 1430 and the reference identifier of the second user 1440. The first server 1410 may generate a remittance request message that includes the reference identifier of the first user 1430 as a remitter, includes the reference identifier of the second user 1440 as a remittee, and further includes a remittance amount input from the first user 1430, and may transmit the generated remittance request message to the second server 1420. If the reference identifier of the second user 1440 is not shared yet between the first server 1410 and the second server 1420, a telephone number selected from a telephone directory stored in the electronic device of the first user 1430 or a telephone number input from the first user 1430 may be included as information about the remitter.

In a remittance processing process 1550, the second server 1420 may recognize the first user 1430 corresponding to the remitter and the second user 1440 corresponding to the remittee based on reference identifiers included in the received remittance request message, and may process the remittance using the second payment service of the second server 1420. In at least some example embodiments, the second server 1420 may transmit a short message service (SMS) message to an electronic device of the second user 1440. Here, the SMS message may include a uniform resource locator (URL) to a page on which the second user 1440 may verify content of the remittance and agree with the remittance. In at least some example embodiments, the second server 1420 may also transfer the URL to the second user 1440 using the messenger service provided from the first server 1410. In at least some example embodiments, the second server 1420 may request the first server 1410 to transmit an instant message that includes the URL to the second user 1440 using the reference identifier of the second user 1440. In this case, the first server 1410 may identify the second user 1440 based on the reference identifier of the second user 1440 included in the request, and may provide the instant message that includes the aforementioned URL using a messenger account of the identified second user 1440.

Here, the second user 1440 may connect to the page using the URL included in the SMS message and may agree with the remittance. In response to the agreement of the second user 1440 with the remittance, the second server 1420 may process the remittance by transferring a requested amount from an account of the first user 1430 to an account of the second user 1440. In at least some example embodiments, in response to a selection of the second user 1440 on the URL displayed on the electronic device, such as, in response to a touch of the second user 1440 on an area on which the URL is displayed in a touch screen environment using a finger, a payment app may be automatically executed on the electronic device of the second user 1440 and the page may be provided to the second user 1440 under control of the payment app.

If the payment app is not installed on the electronic device of the second user 1440, a process for installing the payment app may be additionally performed. Also, if the reference identifier of the second user 1440 is not generated yet, or if the second user 1440 is not a member of the second payment service, the aforementioned processes of FIG. 14 may be performed to register the second user 1440 as a member of the second payment service or to share the reference identifier of the second user 1440. According to at least some example embodiments, operations described herein as being performed by any or all of the chatroom generation process 1510, the remittance request-1 process 1520, the remittee recognition process 1530, the messenger service, the second payment service, the remittance request-2 process 1540, the remittance processing process 1550, and the payment app may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

Figure 16:
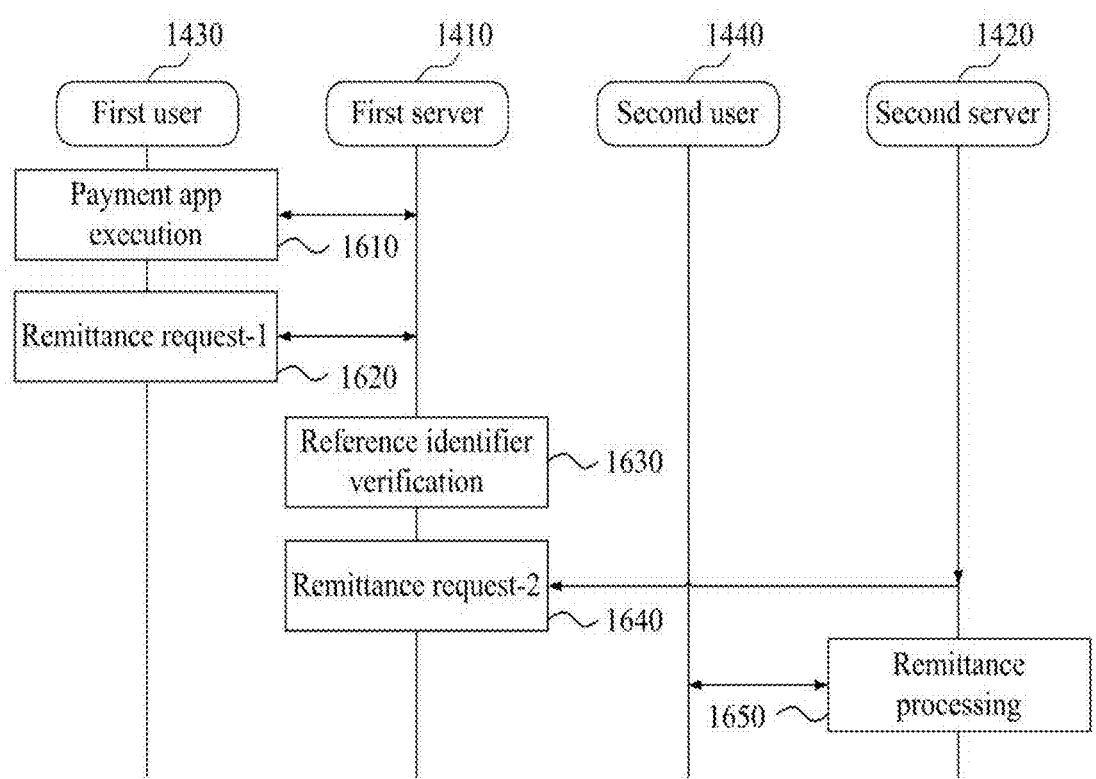
FIG. 16 is a diagram illustrating a process of facilitating a request from a first user executing a payment application using a reference identifier according to at least some example embodiments.

FIG. 16 is a diagram illustrating a process of facilitating a request from a first user executing a payment application using a reference identifier according to at least some example embodiments. In at least some example embodiments, the first server 1410 may correspond to the server 150, the second server 1420 may correspond to the server 160, the first user 1430 may correspond to the electronic device 110, and the second user 1440 may correspond to the electronic device 120 as described further in association with FIGS. 1 and 2.

In a payment app execution process 1610, the first user 1430 may connect to the first server 1410 through a payment app. Here, the first user 1430 may log in a second payment service of the second server 1420 through a login function to the second payment service of the second server 1420, provided from the first server 1410 through API call.

In a remittance request-1 process 1620, the first user 1430 may request the first server 1410 for a remittance to the second user 1440 through the payment app. In at least some example embodiments, a user interface configured for a remittance request may be provided to the first user 1430 through the payment app, and the first user 1430 may input information, such as, a remittance amount, information about a remittee, etc., through the provided user interface, and may transmit a remittance request message to the first server 1410. Dissimilar to at least some example embodiments of FIG. 15, the first server 1410 may not immediately specify the remittee. Thus, the first server 1410 may receive a telephone number of the remittee as information about the remitter from the first user 1430. In at least some example embodiments, the first user 1430 may select a desired telephone number by reading a telephone directory under control of the payment app, or may input a telephone number of the remittee in an input box included in the user interface. In this manner, the first user 1430 may transmit the telephone number of the remittee to the first server 1410.

In a reference identifier verification process 1630, the first server 1410 may verify a reference identifier of the first user 1430. In at least some example embodiments, the first server

1410 may acquire a reference identifier of the first user 1430 by searching a user database of the first server 1410 based on a first identifier that is an identifier of the first user 1430 in a first user identification system.

In a remittance request-2 process 1640, the first server 1410 may request the second server 1420 for a remittance using the reference identifier of the first user 1430 and a telephone number of the second user 1440. In at least some example embodiments, the first server 1410 may generate a remittance request message that includes the reference identifier of the first user 1430, the telephone number of the second user 1440, and a requested remittance amount, and may transmit the remittance request message to the second server 1420. Information, such as, the reference identifier of the first user 1430, the telephone number of the second user 1440, the remittance amount, etc., may be transmitted to the second server 1420 through a function provided in response to an API call of the first server 1410.

In a remittance processing process 1650, the second server 1420 may process a remittance request. In at least some example embodiments, the second server 1420 may identify the first user 1430 as a remitter based on the reference identifier of the first user 1430 and may identify the second user 1440 as a remittee based on the telephone number of the second user 1440. Here, the second server 1420 may process the remittance request by processing a remittance amount to be transferred from an account of the first user 1430 identified as the remitter to an account of the second user 1440 identified as the remittee. As described above, the second server 1420 may process the remittance by verifying content of the remittance, by providing a URL to a page for receiving an agreement with the remittance to the second user 1440, and by acquiring the agreement of the second user 1440. If the reference identifier of the second user 1440 is not generated yet or if the second user 1440 is not a member of the second payment service, the aforementioned processes of FIG. 14 may be performed to register the second user 1440 as a member of the second payment service and to share the reference identifier of the second user 1440. According to at least some example embodiments, operations described herein as being performed by any or all of the payment app execution process 1610, the payment app, the second payment service, the login function, the remittance request-1 process 1620, the reference identifier verification process 1630, the remittance request-2 process 1640, and the remittance processing process 1650 may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

Hereinafter, at least some example embodiments of user interfaces provided to users will be described.

Figure 17:
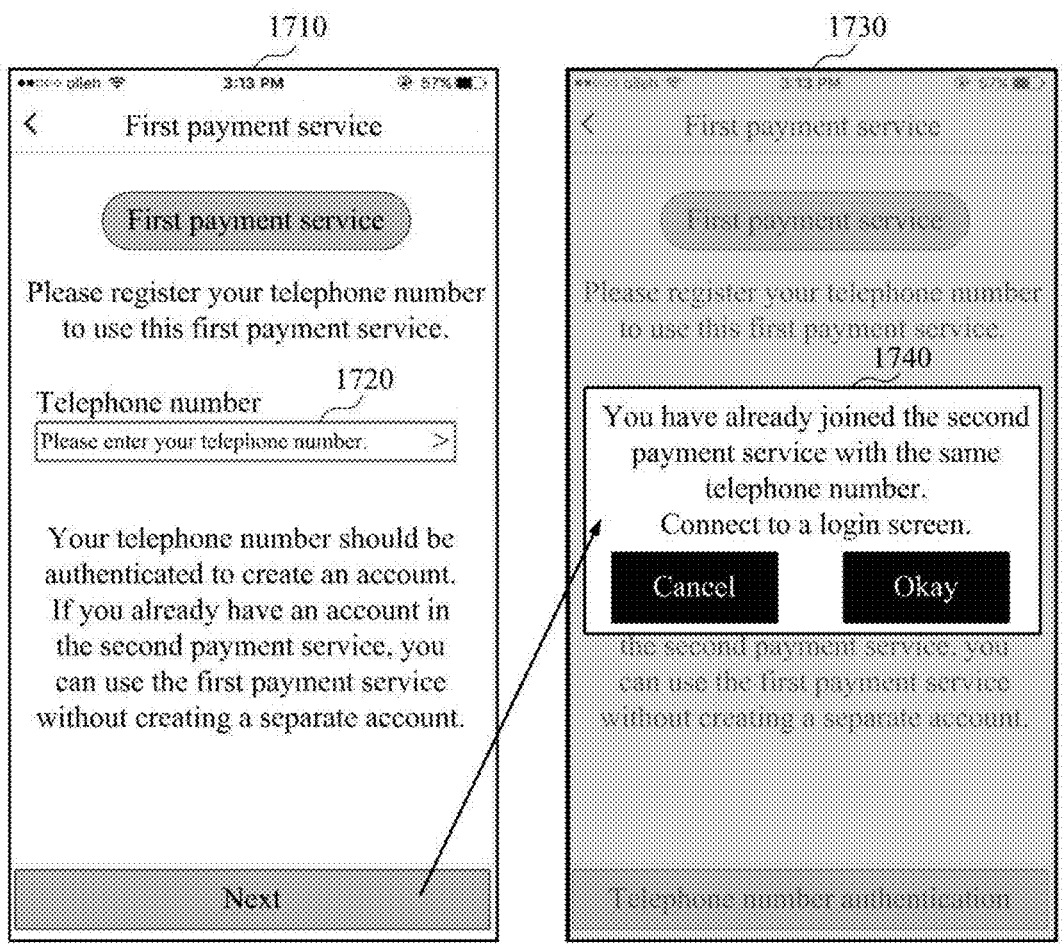
FIG. 17 illustrates a user interface for receiving a telephone number of a user according to at least some example embodiments.

FIG. 17 illustrates at least some example embodiments of a user interface for receiving a telephone number of a user according to at least some example embodiments. Referring to FIG. 17, a first screen 1710 is provided to a user in response to the user executing a payment app to use a first payment service, and may provide a user interface 1720 for receiving a telephone number of the user according to at least some example embodiments. As described above, while a service may be provided in the name of the first payment service, substantial processing of the service may be performed through a second payment service. Accordingly, receiving the telephone number of the user may correspond to at least some example embodiments in which the server 150 using a first user identification system receives, from the user, an identifier, such as, a telephone number, of the user associated with the server 160 using a second user identification system. Once the user inputs the telephone number of the user through the user interface 1720, the server 150 may verify whether the input telephone number is registered to the server 160. If the telephone number input from the user is registered to the server 160, the user may determine that the user is a member of the second payment service provided from the server 160. Here, the server 150 may generate a reference identifier of the user, may transmit the generated reference identifier and the input telephone number to the server 160, and may share the reference identifier of the user with the server 160. In contrast, if the input telephone number is not registered to the server 160, the server 150 may provide the user with a function for joining the second payment provided from the server 160. A second screen 1730 provides a popup window 1740 for notifying the user that the user has joined the second payment service using the corresponding telephone number according to at least some example embodiments.

In at least some example embodiments, the server 150 may provide the user with a function provided from the server 160 through an API call, and information, such as a name, an email address, a birth date, a secrete question, a reply thereto, etc., input from the user through the provided function may be transferred to the server 160. Also, the user may be authenticated at the server 160 using a one time password (OTP) through the function, and the authenticated user may join the second payment service of the server 160 as a member.

Also, the server 150 may provide the user with a function of a PIN login for the second payment service through an API call, and may provide existing account information in the second payment service, such as balance in an account, to the user having logged in the second payment service. Here, the server 150 may request the server 160 for a PIN login, providing of account information, etc., using the reference identifier instead of using separate personal information. According to at least some example embodiments, operations described herein as being performed by any or all of the payment app, the first payment service, and the second payment service may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

Figure 18:
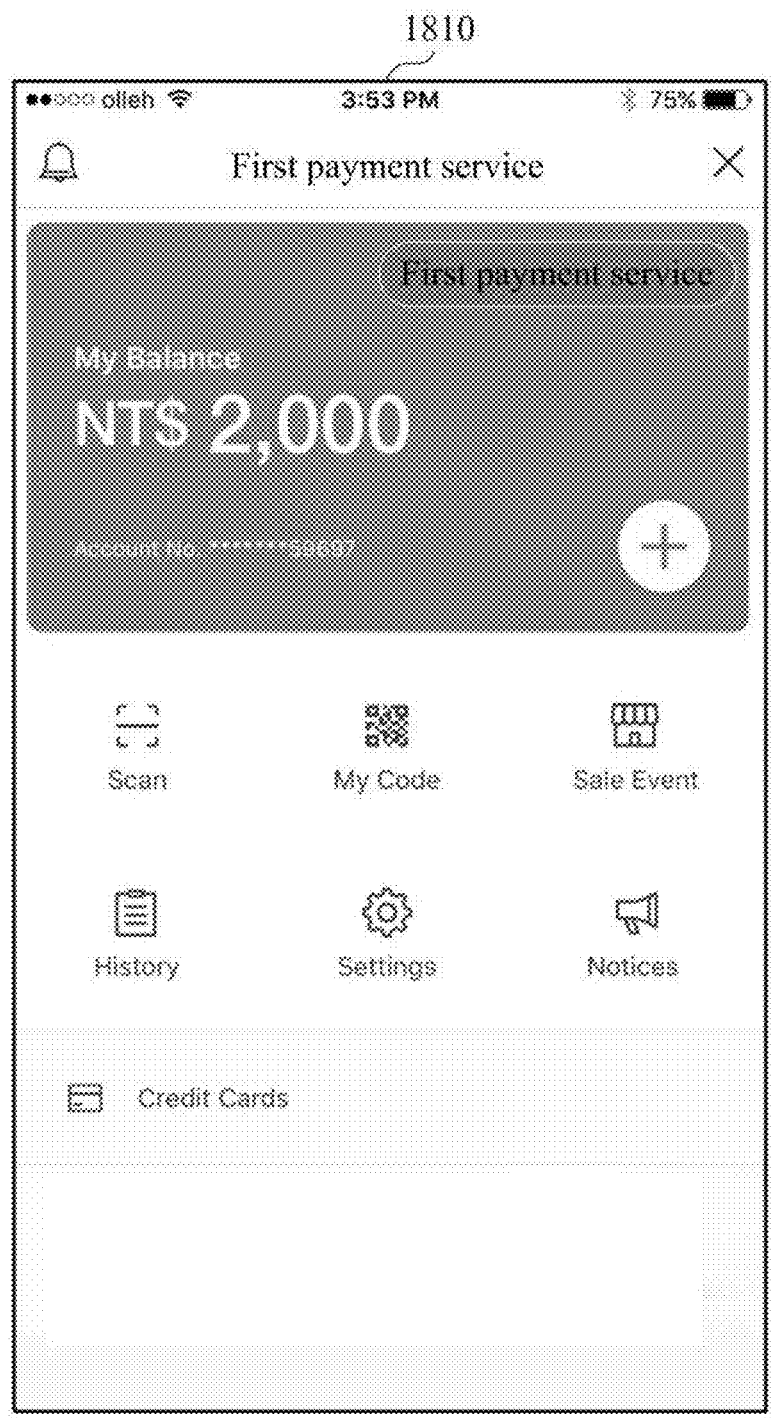
FIG. 18 illustrates a screen for interworking between a first payment service and a second payment service according to at least some example embodiments.

FIG. 18 illustrates a screen for interworking between a first payment service and a second payment service according to at least some example embodiments. Referring to FIG. 18, a screen 1810 is may be displayed when fetching account information, such as a balance of a user, from the second payment service and displaying the account information at the first payment service according to at least some example embodiments. Here, the server 150 may display information fetched from the server 160 through an API call using a reference identifier on the screen 1810 and may not store or manage the information. A variety of services, such as a function for a remittance to another user, a function for a deposit to an account, a function for a withdrawal from an account, etc., may be provided on the screen 1810 of the first payment service. The user may request a desired service using the corresponding functions, and the service requested from the user may be transferred to the second payment service using the reference identifier, such that substantial processing of the service may be performed through the second payment service. In at least some example embodiments, the user may input a telephone number of a remittee or may input a telephone number of a remittee by selecting a desired user from a telephone directory and the like. Also, the user may input a desired remittance amount. Here, the server 150 may transmit a remittance request message that includes the reference identifier of the user as a remitter, includes the input telephone number as a telephone number of a remittee, and further includes the input remittance amount to the server 160 that provides the second payment service. The server 160 may process a substantial remittance between the remitter and the remittance based on the received remittance request message.

According to at least some example embodiments, operations described herein as being performed by any or all of the first payment service and the second payment service may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

Figure 19:
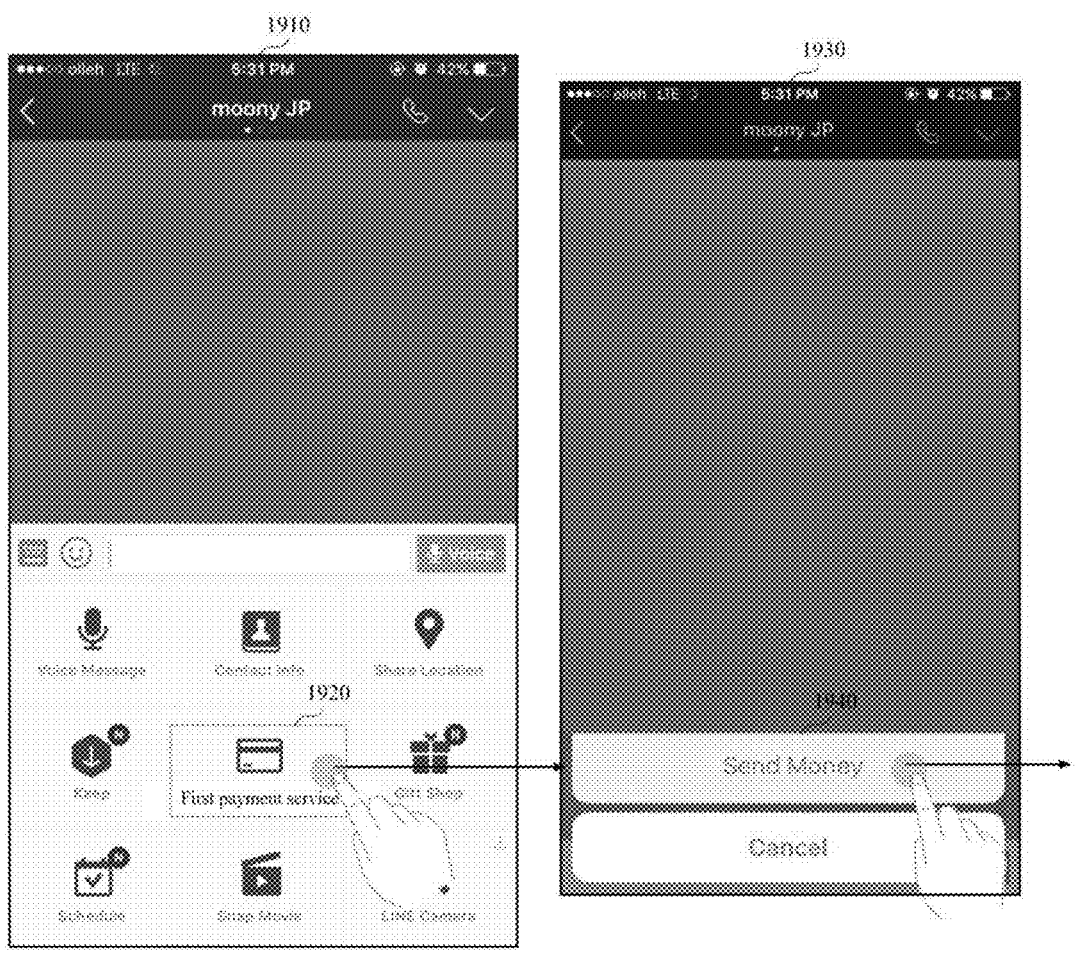
FIG. 19 illustrates a remittance process at a chatroom according to at least some example embodiments.

FIG. 19 illustrates a remittance process at a chatroom according to at least some example embodiments. Referring to FIG. 19, a first screen 1910 is a messenger chatroom screen that is provided to a user according to at least some example embodiments. The messenger chatroom screen may include a variety of user interfaces. A first user interface 1920 for interworking with a first payment service may be displayed on the first screen 1910. In response to a user selection on the first user interface 1920, such as, in response to a user touch on a corresponding area in a touch screen environment, a second user interface 1940 for a remittance displayed on a second screen 1930 may be provided to the user. In response to a user selection on the second user interface 1940, a user interface for specifying a remittee and a user interface for specifying a remittance amount may be provided to the user. Another user with whom the user is currently chatting through a messenger chatroom may be set as a default value of the remittee.

In this case, a remittance request message that includes information, such as a reference identifier of the user, a reference identifier of the specified remittee, the remittance amount, and the like, may be transmitted to the server 160 that provides the second payment service, and substantial processing of the remittance may be performed through the second payment service of the server 160. As described above, although the reference identifier of the remittee is not shared, a process for generating the reference identifier of the remittee may be further performed through the processes of FIG. 14. According to at least some example embodiments, operations described herein as being performed by any or all of the messenger chatroom, the first payment service, and the second payment service may be performed by at least one processor (e.g., the processor 222 of the server 150, the processor 222 of the server 160, the processor 212 of the electronic device 110, the processor 212 of the electronic device 120, etc.) executing program code that includes instructions corresponding to the operations. The instructions may be stored in a memory of an electronic device (e.g., the memory 221 of the server 150, the memory 221 of the server 160, the memory 211 of the electronic device 110, the memory 211 of the electronic device 120, etc.).

At least some example embodiments describe that the server 150 provides all of the messenger service and the first payment service. Alternatively, the messenger service and the first payment service may be provided from the separate server apparatuses, respectively. In at least some example embodiments, the server 150 may be configured as a plurality of server apparatuses. In at least some example embodiments, at least one server apparatus among the plurality of server apparatuses may provide the messenger service and at least one another server apparatus among the plurality of server apparatuses may provide the first payment service. In at least some example embodiments, the plurality of server apparatuses may be physically present in the same location, or may be physically located in different locations. Likewise, the server 160 may be configured as a plurality of server apparatuses.

According to at least some example embodiments, servers using different user identification systems may generate and share separate reference identifiers for users and may identify the users associated with service interworking without communication about or sharing personal information of the users.

The units and/or constituent elements described herein may be implemented using hardware components, software components, or a combination thereof. In at least some example embodiments, a processing device may be implemented using one or more general-purpose or special purpose computers, such as, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciated that a processing device may include multiple processing elements and multiple types of processing elements. In at least some example embodiments, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Instructions for implementing at least some example embodiments may be recorded in non-transitory computer-readable media. These instructions may include program instructions to implement various operations embodied by a computer. The media may also include, alone or in combination with the program instructions, data files, data structures, and the like. According to at least some embodiments, the media and program instructions may be those specially designed and constructed for the purpose of implementing at least some example embodiments. At least some example embodiments of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. At least some example embodiments of program instructions include both machine code, such as that produced by a compiler, and files containing higher level code that may be executed by the computer using an interpreter. The described hardware devices may be to act as one or more software modules in order to perform the operations of at least some example embodiments.

The foregoing description has been provided for purposes of illustration and description. It is not intended to be exhaustive or to limit the disclosure. Individual elements or features of at least some example embodiments are generally not limited to those example embodiments, but, where applicable, are interchangeable and may be used in at least some example embodiments, even if not specifically shown or described. The same may also be varied in many ways. Such variations are not to be regarded as a departure from the disclosure, and all such modifications as would be obvious to one skilled in the art are intended to be included within the scope of the disclosure.

What is claimed is:

1. A service interworking method performed by a first server to identify registered users using a plurality of different user identification systems, the first server having at least one processor and being configured to identify a first plurality of registered users using a first user identification system among the plurality of different user identification systems, the method comprising:
   generating, using the at least one processor, a first reference identifier of a first user among the first plurality of registered users, the first reference identifier being a unique value for the first user and each of the first plurality of registered users being associated with a respective reference identifier in the first server;
   associating, using the at least one processor, the first reference identifier with a first identifier identifying the first user in the first user identification system;
   receiving, using the at least one processor, a second identifier identifying the first user in a second user identification system among the plurality of different user identification systems from the first user;
   sending, using the at least one processor, a first message including the first reference identifier and the second identifier to a second server for identifying a second plurality of registered users using the second user identification system, the second server being unable to determine the first identifier using the first reference identifier; and
   sending, using the at least one processor, a second message including the first reference identifier to the second server after the sending the first message, the second message not including the first identifier or the second identifier, the second message requesting a service associated with the first user from the second server such that the second server,
   determines the second identifier based on the first reference identifier, and
   identifies the first user to apply the service at the second server based on the second identifier in response to the determination of the second identifier.

2. The method of claim 1, wherein the sending the first message causes the second server to,
   identify the first user based on the second identifier, and
   associate the first reference identifier with the first user in response to the identification of the first user based on the second identifier.

3. The method of claim 1, further comprising:
   receiving, using the at least one processor, a service request that includes the first reference identifier from the second server; and
   identifying, using the at least one processor, the first user based on the first identifier corresponding to the first reference identifier in response to the service request.

4. The method of claim 1, wherein
   the first user identification system is configured to identify the first user registered to a messenger service provided from the first server by employing a messenger identifier of the messenger service as the first identifier, and
   the second user identification system is configured to identify the first user registered to a payment service provided from the second server by employing a telephone number of the first user as the second identifier.

5. The method of claim 1, wherein
   the first reference identifier does not include personal information of the first user,
   the sending the second message to the second server causes the second server to identify the first user for service interworking based on the first reference identifier without communicating the personal information of the first user with the first server, and
   the method further comprises identifying, using the at least one processor, the first user for service interworking based on the first reference identifier without communicating the personal information of the first user with the second server.

6. The method of claim 1, further comprising:
   sending, using the at least one processor, a first remittance request, that includes the first reference identifier and a second reference identifier of a second user, to the second server in response to a second remittance request from the first user through a conversation session, the conversation session being between a messenger account of the first user and a messenger account of the second user such that the second server processes a remittance by,
   identifying the first user as a remitter based on the first reference identifier, and
   identifying the second user as a remittee based on the second reference identifier.

7. A service interworking method performed by a first server to identify registered users using a plurality of different user identification systems, the first server having at least one processor and being configured to identify a first plurality of registered users using a first user identification system among the plurality of different user identification systems, the method comprising:
   receiving, using the at least one processor, a first message from a second server for identifying a second plurality of registered users using a second user identification system among the plurality of different user identification systems, the first message including a first identifier and a first reference identifier generated at the second server, the first identifier identifying a first user among the first plurality of registered users in the first user identification system, the first reference identifier identifying the first user, the first server being unable to use the first reference identifier to determine a second identifier of the second user identification system used by the second server for identifying the first user;

first identifying, using the at least one processor, the first user based on the first identifier in response to the receiving the first message;

associating, using the at least one processor, the first reference identifier with the first user in response to the first identifying, the first reference identifier being a unique value for the first user and each of the first plurality of registered users being associated with a respective reference identifier in the first server;

receiving, using the at least one processor, a second message including the first reference identifier from the second server after the receiving the first message, the second message not including the first identifier or the second identifier, the second message requesting a service associated with the first user from the first server;

determining, using the at least one processor, the first identifier based on the first reference identifier in response to the receiving the second message; and second identifying, using the at least one processor, the first user to apply the service at the first server based on the first identifier in response to the determining the first identifier.

8. The method of claim 7, wherein the first reference identifier is associated with the second identifier at the second server.

9. The method of claim 7, further comprising:
requesting, using the at least one processor, a service associated with the first user from the second server using the first reference identifier of the first user such that the second server identifies the first user to apply the service at the second server based on the first reference identifier.

10. The method of claim 7, wherein
the first user identification system is configured to identify the first user registered to a payment service provided from the first server by employing a telephone number of the first user as the first identifier, and
the second user identification system is configured to identify the first user registered to a messenger service provided from the second server by employing a messenger identifier of the messenger service as the second identifier.

11. The method of claim 7, wherein
the first reference identifier does not include personal information of the first user such that the second server identifies the first user for service interworking based on the first reference identifier without communicating the personal information of the first user with the first server, and
the method further comprises identifying, using the at least one processor, the first user for service interworking based on the first reference identifier without communicating the personal information of the first user with the second server.

12. The method of claim 7, further comprising:
receiving a first remittance request from the first user through a conversation session between a messenger account of the first user and a messenger account of a second user;
sending the first remittance request to the second server such that the second server generates a second remittance request based on the first remittance request;
receiving, using the at least one processor, the second remittance request from the second server, the second remittance request including the first reference identifier and a second reference identifier of the second user; and
processing, using the at least one processor, a remittance by,
identifying the first user as a remitter based on the first reference identifier, and
identifying the second user as a remittee based on the second reference identifier.

13. A service interworking device configured to identify a first plurality of registered users using a first user identification system, the device comprising:
a non-transitory memory having computer-readable instructions stored thereon; and
one or more processors communicatively coupled to the memory and configured to execute the computer-readable instructions to
generate a first reference identifier of a first user, the first reference identifier being a unique value for the first user and each of the first plurality of registered users being associated with a respective reference identifier in the device,
associate the first reference identifier with a first identifier identifying the first user in the first user identification system,
receive a second identifier identifying the first user in a second user identification system from the first user,
send a first message including the first reference identifier and the second identifier of the first user to a server for identifying a second plurality of registered users using the second user identification system, the server being unable to determine the first identifier using the first reference identifier, and
send a second message including the first reference identifier to the server after the first message is sent, the second message not including the first identifier or the second identifier, the second message requesting a service associated with the first user from the server such that the server,
determines the second identifier based on the first reference identifier, and
identifies the first user to apply the service at the server based on the second identifier in response to the determination of the second identifier.

14. The service interworking device of claim 13, wherein the second message causes the server to:
identify the first user based on the second identifier; and
associate the first reference identifier with the first user in response the identification of the first user based on the second identifier.

15. The service interworking device of claim 13, wherein the one or more processors are further configured to:
receive a service request that includes the first reference identifier from the server, and
identify the first user based on the first identifier corresponding to the first reference identifier in response to the service request.

16. The service interworking device of claim 13, wherein
the first user identification system is configured to identify the first user registered to a messenger service provided from the device by employing a messenger identifier of the messenger service as the first identifier, and
the second user identification system is configured to identify the first user registered to a payment service provided from the server by employing a telephone number of the first user as the second identifier.

17. The service interworking device of claim 13, wherein the one or more processors are further configured to:
send a first remittance request, that includes the first reference identifier and a second reference identifier of a second user, to the server in response to a second remittance request from the first user through a conversation session, the conversation session being between a messenger account of the first user and a messenger account of the second user such that the server processes a remittance by,
identifying the first user as a remitter based on the first reference identifier, and
identifying the second user as a remittee based on the second reference identifier.

18. The method of claim 1, further comprising:
receiving, using the at least one processor, a user request for transaction between the first user and a second user from the first user through a conversation session between a messenger account of the first user and a messenger account of the second user; and
sending, using the at least one processor, a third message including the first reference identifier and a second reference identifier of the second user to the second server in response to the user request being received, the third message not including the first identifier or the second identifier,
wherein the first plurality of registered users includes the second user, and the second reference identifier is associated with an identifier identifying the second user in the first user identification system, and
wherein the first user and the second user are identified using the first reference identifier and the second reference identifier, respectively, by the second server.

19. The method of claim 7, further comprising:
receiving, using the at least one processor, a user request for transaction between the first user and a second user from the first user through a conversation session between a messenger account of the first user and a messenger account of the second user;
receiving, using the at least one processor, a third message including the first reference identifier and a second reference identifier of a second user from the second server, the third message being generated based on a user request for transaction between the first user and the second user from the first user through a conversation session between a messenger account of the first user and a messenger account of the second user, and the third message not including the first identifier or the second identifier; and
identifying, using the at least one processor, the first user and the second user using the first reference identifier and the second reference identifier, respectively,
wherein the second plurality of registered users includes the second user, and the second reference identifier is associated with an identifier identifying the second user in the second user identification system.

20. The service interworking device of claim 13, wherein the one or more processors are further configured to:
receive a user request for transaction between the first user and a second user from the first user through a conversation session between a messenger account of the first user and a messenger account of the second user; and
send a third message including the first reference identifier and a second reference identifier of the second user to the server in response to the user request being received, the third message not including the first identifier or the second identifier,
wherein the second reference identifier is associated with an identifier identifying the second user in the first user identification system, and
wherein the first user and the second user are identified using the first reference identifier and the second reference identifier, respectively, by the server.

21. The method of claim 1, wherein the second server is unable to determine the first identifier using the first message.

\* \* \* \* \*

UNITED STATES PATENT AND TRADEMARK OFFICE
CERTIFICATE OF CORRECTION

PATENT NO. : 10,616,003 B2
APPLICATION NO. : 15/584194
DATED : April 7, 2020
INVENTOR(S) : Boram Kim et al.

Page 1 of 1

It is certified that error appears in the above-identified patent and that said Letters Patent is hereby corrected as shown below:

On the Title Page

(71) Applicant Should read: Line Pay Corporation, Tokyo (JP)

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*